United States Patent
Musha et al.

(10) Patent No.: US 8,320,064 B2
(45) Date of Patent: Nov. 27, 2012

(54) LENS BARREL AND OPTICAL DEVICE INCLUDING THE SAME

(75) Inventors: Megumi Musha, Utsunomiya (JP); Hiroyoshi Inaba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 12/949,011

(22) Filed: Nov. 18, 2010

(65) Prior Publication Data

US 2011/0122518 A1    May 26, 2011

(30) Foreign Application Priority Data

Nov. 20, 2009 (JP) ................. 2009-264957
Sep. 1, 2010 (JP) ................. 2010-195633

(51) Int. Cl.
*G02B 7/02* (2006.01)
*G02B 15/14* (2006.01)

(52) U.S. Cl. .................. 359/823; 359/704; 359/811

(58) Field of Classification Search .......... 359/694–704, 359/811–824; 396/52, 55, 421, 535, 540, 396/541, 448; 348/208.99, 335, 337, 373–376
See application file for complete search history.

(56) References Cited

U.S. PATENT DOCUMENTS 6,597,517 B2 * 7/2003 Imaoka et al. ................ 359/697
7,978,264 B2 * 7/2011 Takahashi ..................... 348/374

FOREIGN PATENT DOCUMENTS

JP        9-318862 A    12/1997

* cited by examiner

*Primary Examiner* — Mohammed Hasan
(74) *Attorney, Agent, or Firm* — Canon U.S.A., Inc. IP Division

(57) ABSTRACT

A lens barrel includes a first frame configured to hold a first optical element, be movable in an optical-axis direction, and hold a position of the optical element in the optical-axis direction in a nonenergized state; a second frame configured to hold a second optical element, be movable in the optical-axis direction, and not hold a position of the optical element in the optical-axis direction in the nonenergized state; and a shock-absorbing portion provided at least one of the first and second frames. In the nonenergized state, the first frame is positioned within a range of the second frame.

11 Claims, 20 Drawing Sheets

XVII, XVIII, XIX

LENS BARREL AND OPTICAL DEVICE INCLUDING THE SAME

BACKGROUND OF THE INVENTION

1. Field of the Invention

The present invention relates to a lens barrel including a plurality of movable lens frames, and an optical device including the lens barrel.

2. Description of the Related Art

A lens barrel used for an optical device, such as a digital still camera or a video camera, performs zooming and focusing by moving a movable lens frame that holds a lens in an optical-axis direction by a driving force from a drive source. For example, a voice coil motor (VCM) including a stepping motor, a magnet, and a coil is used as a drive unit (drive source or actuator) that moves the movable lens frame.

In many cases, a lens barrel typically has an actuator with a structure that does not have a self-holding force in a nonenergized state in which power (drive source) is OFF. An optical element and a movable frame holding the optical element may move in the nonenergized state by a self weight and an inertial force. Then, the movable lens may contact a mechanical end (end surface) that defines a limit of a movable range of the movable lens frame. Then, the position of the movable lens frame may be changed, and a reference position (origin position) referenced when the movable lens frame moves in an energized state may be changed. Hence, movement accuracy may be degraded. Also, loud collision sound occurs when the movable lens frame contacts the end surface. A user may feel uncomfortable with the sound.

To reduce an adverse effect on an optical system when the movable lens frame collides with the mechanical end during zooming, Japanese Patent Laid-Open No. 9-318862 discloses an optical device including a rotational lever (stopper) provided at the mechanical end, and an elastic member arranged between the mechanical end and the rotational lever.

In the optical device disclosed in Japanese Patent Laid-Open No. 9-318862, the elastic member is provided near the rotational lever to reduce the effect upon the collision of the movable lens frame with the mechanical end. When the elastic member contacts the movable lens frame, the elastic member is deformed. The contact position slightly varies every time when the contact occurs. If the optical device has a configuration that correctly detects the position of the mechanical end and detects an origin position referenced when the movable lens frame moves, the movement accuracy may be degraded. Further, since the movable lens frame does not collide with the elastic member, but collides with the rotational lever. This configuration may reduce the shock; however, it is difficult to sufficiently reduce the collision sound.

SUMMARY OF THE INVENTION

A lens barrel according to an aspect of the present invention includes a first frame configured to include a stop portion protruding in an optical-axis direction and hold a first optical element; a first drive unit configured to move the first frame in the optical-axis direction and hold a position in the optical-axis direction of the first frame in a nonenergized state; a second frame configured to include a protrusion protruding in the optical-axis direction and hold a second optical element; a second drive unit configured to move the second frame in the optical-axis direction and not hold a position in the optical-axis direction of the second movable frame in the nonenergized state; and a shock-absorbing portion provided at least one of the first and second frames. The first frame moves such that it is positioned within a range in the optical-axis direction of the second frame when a state is changed from an energized state to the nonenergized state. The shock-absorbing portion absorbs a shock that is generated by the second frame against the first frame when the second frame moves in the optical-axis direction in the nonenergized state and hence the protrusion of the second frame contacts the stop portion of the first frame.

Further features of the present invention will become apparent from the following description of exemplary embodiments with reference to the attached drawings.

DESCRIPTION OF THE EMBODIMENTS

Figure 1:
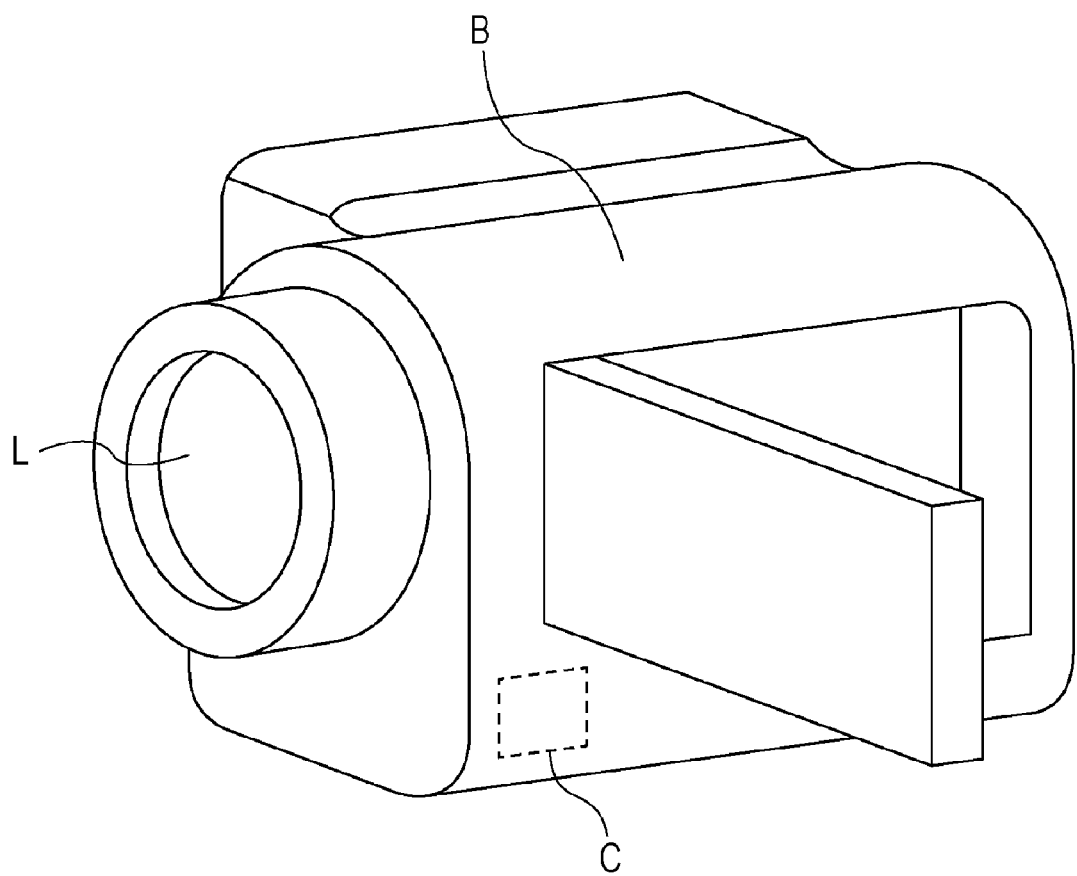
FIG. 1 is a perspective view showing a camera according to a first embodiment of the present invention.

Embodiments of the present invention will be described below with reference to the attached drawings. Referring to FIGS. 7A, 7B, and 8 to 10, a lens barrel according to an embodiment of the present invention includes a first movable frame (variator movable frame) 2 and a second movable frame (focus movable frame) 4.

The first movable frame 2 holds an optical element (second lens unit L2) and includes a stopper (stop portion) 213 protruding in an optical-axis direction. The first movable frame 2 moves in the optical-axis direction by a driving force from a first drive unit (stepping motor) 201 through a transmission portion (rack) 203. When the first drive unit 201 is in a nonenergized state, the position in the optical-axis direction of the first movable frame 2 is held. The second movable frame 4 holds an optical element (fourth lens unit L4) and includes a protruding portion (protrusion) 406 protruding in the optical-axis direction. The second movable frame 4 moves in the optical-axis direction by a driving force from a second drive unit (voice coil motor) including components 401 to 403 (described later). When the second drive unit is in the nonenergized state, the position in the optical-axis direction of the second movable frame 4 is not held. At least one of the first movable frame 2 and the second movable frame 4 includes a shock-absorbing portion (torsion coil spring) 204. When the state is changed from an energized state to the nonenergized state, the first movable frame 2 moves in the optical-axis direction and is located within a movable range in the optical-axis direction of the second movable frame 4. The shock-absorbing portion 204 moves in the optical-axis direction when the second movable frame 4 is in the nonenergized state. Then, when the stopper 213 of the first movable frame 2 contacts the protruding portion 406 of the second movable frame 4, the shock-absorbing portion 204 absorbs the shock by the second movable frame 4 against the first movable frame 2.

The first movable frame 2 is retracted outside the movable range from the movable range of the second movable frame 4 when the state is changed from the nonenergized state to the energized state. The second movable frame 4 includes a contact portion (surface) 407 that is located at a side to which the first movable frame 2 is retracted and contacts a contact surface (surface) 601 included in a rear barrel 6 that is a member different from the first movable frame 2. A position sensor (MR sensor) 405 detects the position at which the contact portion 407 of the second movable frame 4 contacts the contact surface 601 of the rear barrel 6. The position detected by the MR sensor 405 serves as a reference position referenced when the second movable frame 4 moves in the optical-axis direction.

FIG. 1 is a configuration diagram showing an optical device, such as a video camera or a digital still camera, including the lens barrel according to the embodiment of the present invention. The optical device is hereinafter referred to as camera. FIG. 1 illustrates a lens barrel L including an image taking optical system that can perform zooming, and a camera body B that allows the lens barrel L to be detachably mounted thereon. The camera body B accommodates a silver-halide film or an image pickup element for recording an object image formed by the image taking optical system in the lens barrel L.

First Embodiment

Figure 2:
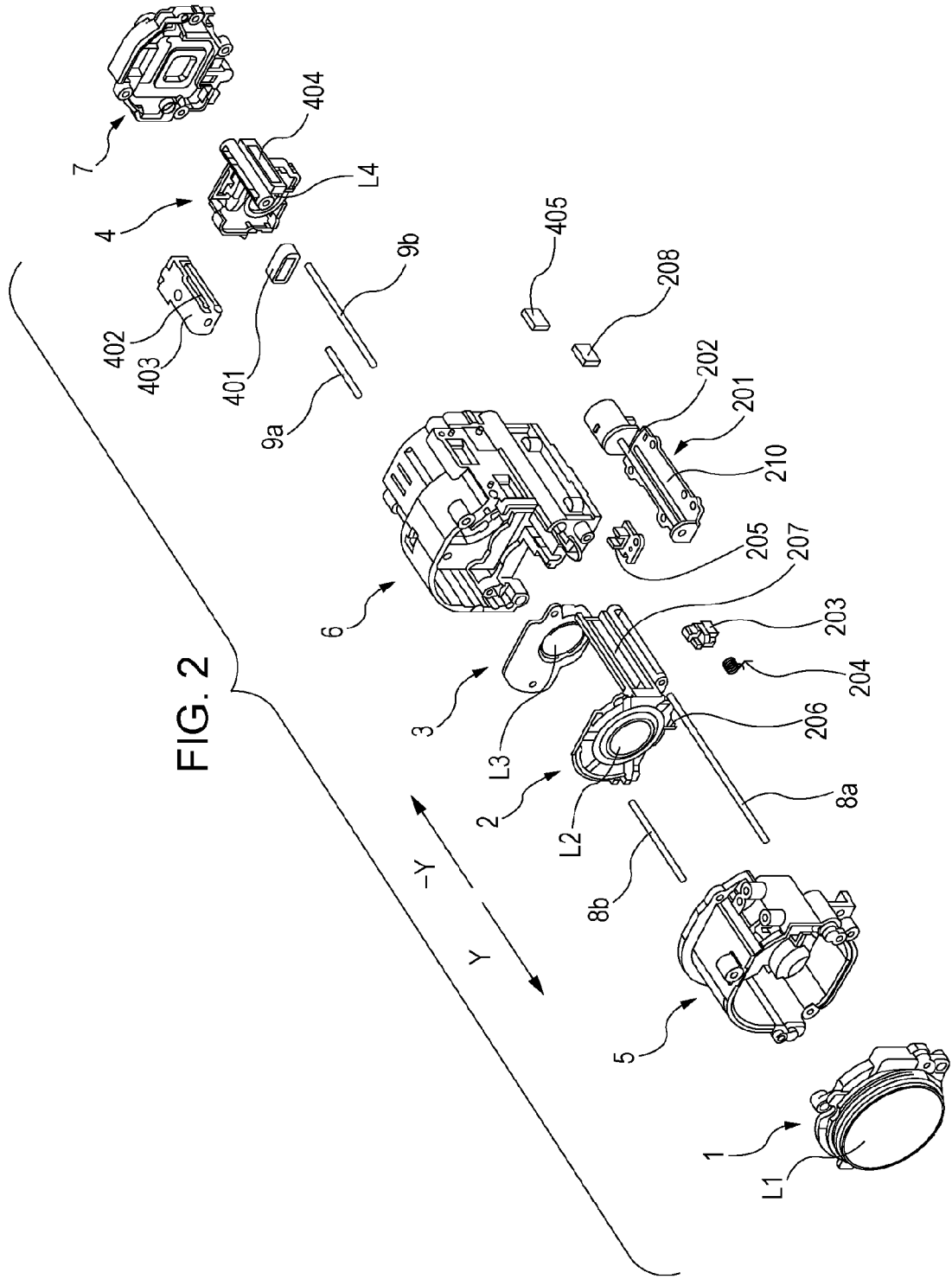
FIG. 2 is an exploded perspective view showing a lens barrel provided in the camera of FIG. 1.
Figure 3:
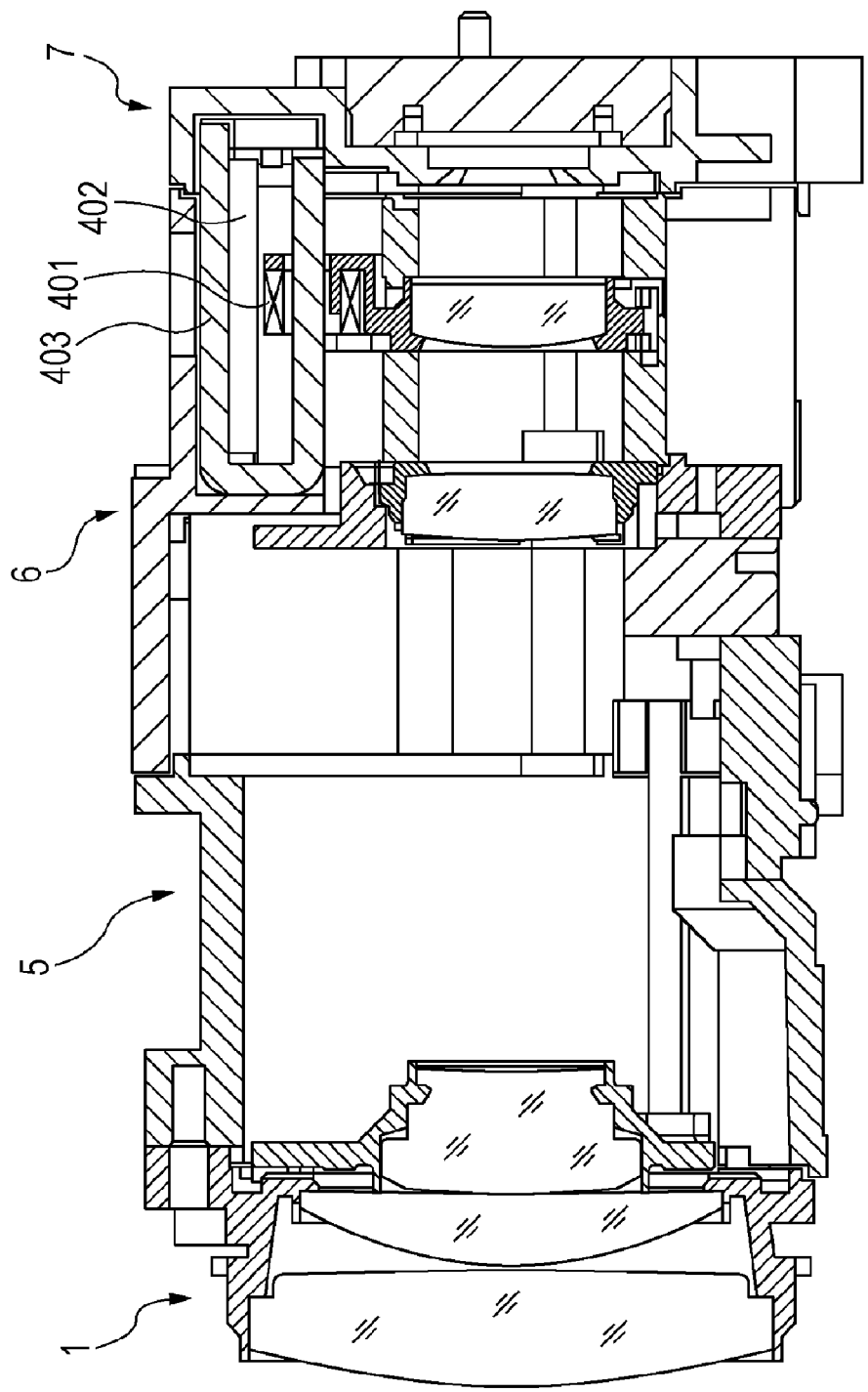
FIG. 3 is a cross-sectional view showing the lens barrel of FIG. 2.

A configuration of a lens barrel L according to a first embodiment of the present invention will be described below with reference to FIGS. 1 to 3. Referring to FIG. 1, the lens barrel L is detachably mounted in a camera body B. The lens barrel L includes an image taking optical system that is a zoom optical system (zoom lens system) including four lens units L1 to L4. Referring to FIGS. 1 to 3, the first lens unit L1 is not movable in an optical-axis direction. The second lens unit L2 moves in the optical-axis direction for zooming. The third lens unit L3 shifts in a direction orthogonal to the optical axis of the image taking optical system (hereinafter, referred to as orthogonal-to-optical-axis direction) for image stabilization that reduces image blur. The fourth lens unit L4 moves in the optical-axis direction for correction of image plane variation as a result of zooming and for focusing.

A L1 lens frame 1 holds the first lens unit L1. A variator movable frame (first movable frame) 2 holds the second lens unit L2. A shift frame 3 holds the third lens unit L3. A focus movable frame (second movable frame) 4 holds the fourth lens unit L4. Also, a fixing barrel 5 and a rear barrel 6 are provided. A rear end of the fixing barrel 5 is coupled with the rear barrel 6, and a front end of the fixing barrel 5 is fixed to the L1 lens frame 1. Hence, the fixing barrel 5 fixes the first lens unit L1 at a predetermined position. A CCD holder 7 holds an image pickup element (photoelectric conversion element), such as a CCD sensor or a CMOS sensor (not shown). The CCD holder 7 is fixed to the rear barrel 6.

A first guide bar 8a and a second guide bar 8b have both ends that are held by the fixing barrel 5 and the rear barrel 6. A third guide bar 9a and a fourth guide bar 9b have both ends that are held by the rear barrel 6 and the CCD holder 7. The variator movable frame 2 is supported by the first and second guide bars 8a and 8b movably in the optical-axis direction. The shift frame 3 is fixed to the rear barrel 6. Also, a light quantity adjusting unit (not shown) is fixed to the rear barrel 6. The light quantity adjusting unit changes a light quantity that enters the image taking optical system. For example, the light quantity adjusting unit may change the diameter of an aperture by moving at least two diaphragm blades in the orthogonal-to-optical-axis direction. The light quantity adjusting unit also causes a gradation ND filter (not shown) to be advanced to and retracted from an optical path independently from the diaphragm blades. The focus movable frame 4 is supported by the third and fourth guide bars 9a and 9b movably in the optical-axis direction.

Next, a configuration of a drive unit (variator drive unit) that moves the variator movable frame 2 (second lens unit L2) will be described. A stepping motor (variator drive unit) 201 drives the second lens unit L2 in the optical-axis direction. An output shaft of the stepping motor 201 has a lead screw 202. The stepping motor 201 is fixed to the rear barrel 6 through a support member 210. The lead screw 202 meshes with a rack (transmission portion) 203 that is attached to the variator movable frame 2. Hence, when electricity is applied to the stepping motor 201 and the lead screw 202 is rotated, the variator movable frame 2 can move in the optical-axis direction through the rack 203. The first movable frame consists of it including the variator movable frame 2 and the rack 203. Backlash between the rack 203 and the variator movable frame 2 in the optical-axis direction is reduced by an urging force of a torsion coil spring (urging portion) 204 that is provided at the variator movable frame 2.

A zoom reset 205 detects a reference position of the variator movable frame 2. The zoom reset 205 includes a photointerrupter that detects a change between a light-shielding state and a light-transmitting state as a result of the movement of a light-shielding portion 206 that is provided at the variator movable frame 2. The zoom reset 205 is fixed to the rear barrel 6 through a substrate. The variator movable frame 2 holds a sensor magnet 207 that is magnetized to have multiple poles in the optical-axis direction. A MR sensor 208 is fixed to the rear barrel 6 at a position facing the sensor magnet 207. The MR sensor 208 reads a change in magnetic lines of force as a result of the movement of the sensor magnet 207. With a signal from the MR sensor 208, a moving distance of the variator movable frame 2, that is, a moving distance of the second lens unit L2 from the predetermined reference position can be detected.

A drive coil 401, a drive magnet 402, and a yoke member 403, which closes magnetic flux, form a focus motor (focus drive unit) that drives the fourth lens unit L4 in the optical-axis direction. The drive coil 401, the drive magnet 402, and the yoke member 403 configure a voice coil motor. The drive coil 401 is attached to the focus movable frame 4. The drive magnet 402 is provided within the yoke member 403. The yoke member 403 is attached to the CCD holder 7. When electric current flows to (or when electricity is applied to) the drive coil 401, a Lorentz force is generated as a result of repulsion between mutual magnetic lines of forces of the drive magnet 402 and the drive coil 401. The Lorentz force drives the focus movable frame 4 and the fourth lens unit L4 held by the focus movable frame 4 in the optical-axis direction. The focus movable frame 4 holds a sensor magnet 404 that is magnetized to have multiple poles in the optical-axis direction. A MR sensor 405 is fixed to the rear barrel 6 at a position facing the sensor magnet 404 provided at the focus movable frame 4. The MR sensor 405 reads a change in magnetic lines of force as a result of the movement of the sensor magnet 404 in the optical-axis direction. With a signal from the MR sensor 405, a moving distance of the focus movable frame 4, that is, a moving distance of the fourth lens unit L4 from a predetermined reference position along the optical axis is detected.

When electricity is applied to the drive coil 401, the focus movable frame 4 moves to an object side, that is, in an arrow Y direction that is parallel to the optical axis. The MR sensor 405 detects a state in which the focus movable frame 4 contacts an end of a movable range (hereinafter, referred to as mechanical end) in the optical-axis direction of the focus movable frame 4, as a reference position (origin position). In other words, referring to FIG. 9, a position at which the contact portion 407 contacts the contact surface 601 is determined as the reference position.

Next, a configuration of a focus drive unit that moves the focus movable frame 4 (fourth lens unit L4) will be described. The focus drive unit generates a Lorentz force when electricity is applied to the drive coil 401 (hereinafter, referred to as energized state). The Lorentz force drives the focus movable frame 4 in the optical-axis direction. When electricity is not applied to the drive coil 401 (hereinafter, referred to as nonenergized state), a driving force is not generated for the focus movable frame 4. In addition, the focus movable frame 4 no longer has a self-holding force. Here, the self-holding force is a force by which the drive coil 401 and the focus movable frame 4 provided with the drive coil 401 are stopped at the current position in the nonenergized state of the drive coil 401. In the nonenergized state, since the focus movable frame 4 does not have the self-holding force, the focus movable frame 4 can freely move along the guide bars 9a and 9b to both ends of the movable range in the optical-axis direction. Hence, if the posture of the camera (image pickup device) is inclined with respect to the horizontal state in the nonenergized state, the focus movable frame 4 moves to either of the mechanical ends, which are the ends of the movable range, while being accelerated, and contacts the mechanical end.

Figure 4:
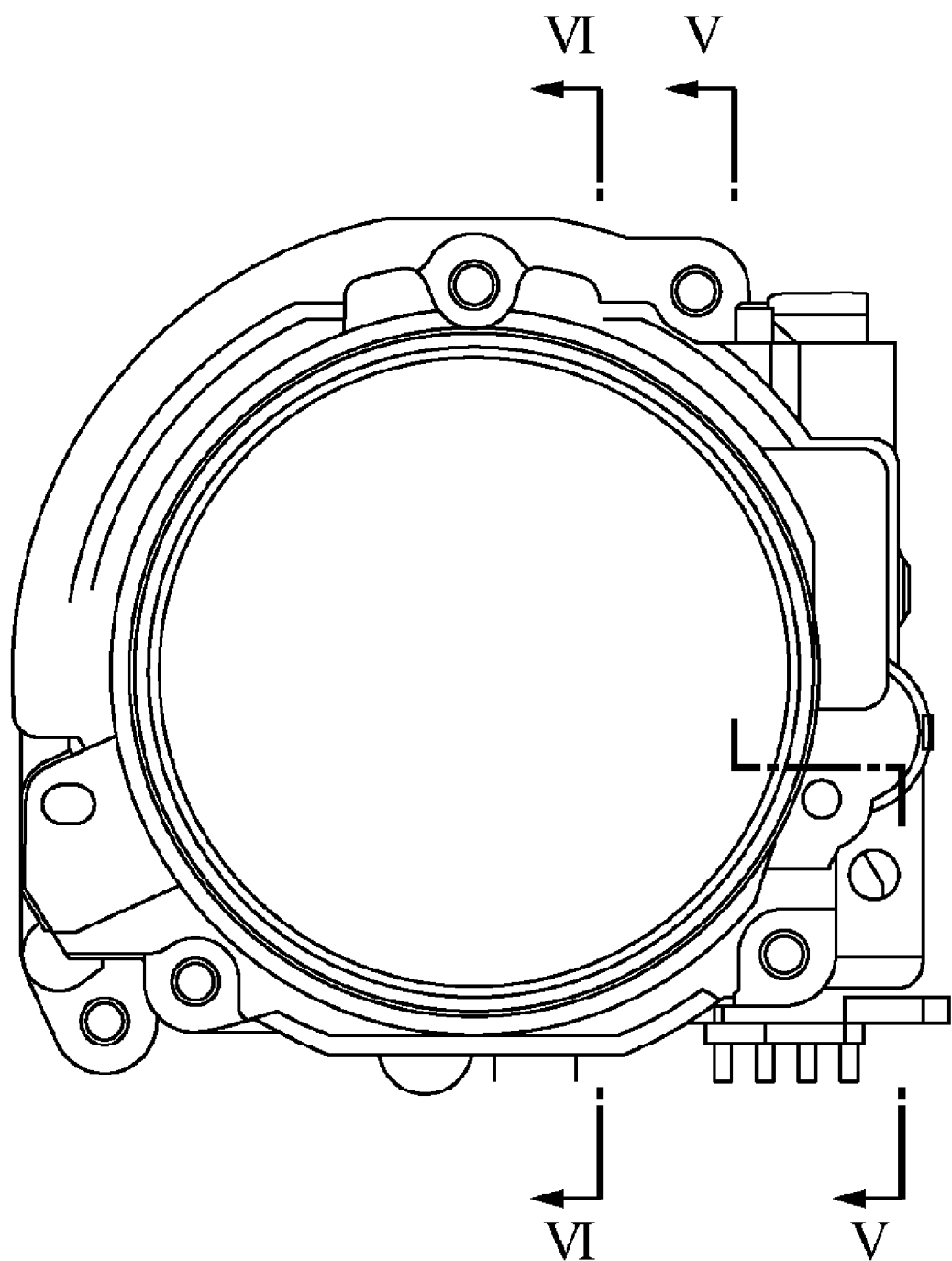
FIG. 4 is a front view showing the lens barrel of FIG. 2.
Figure 5:
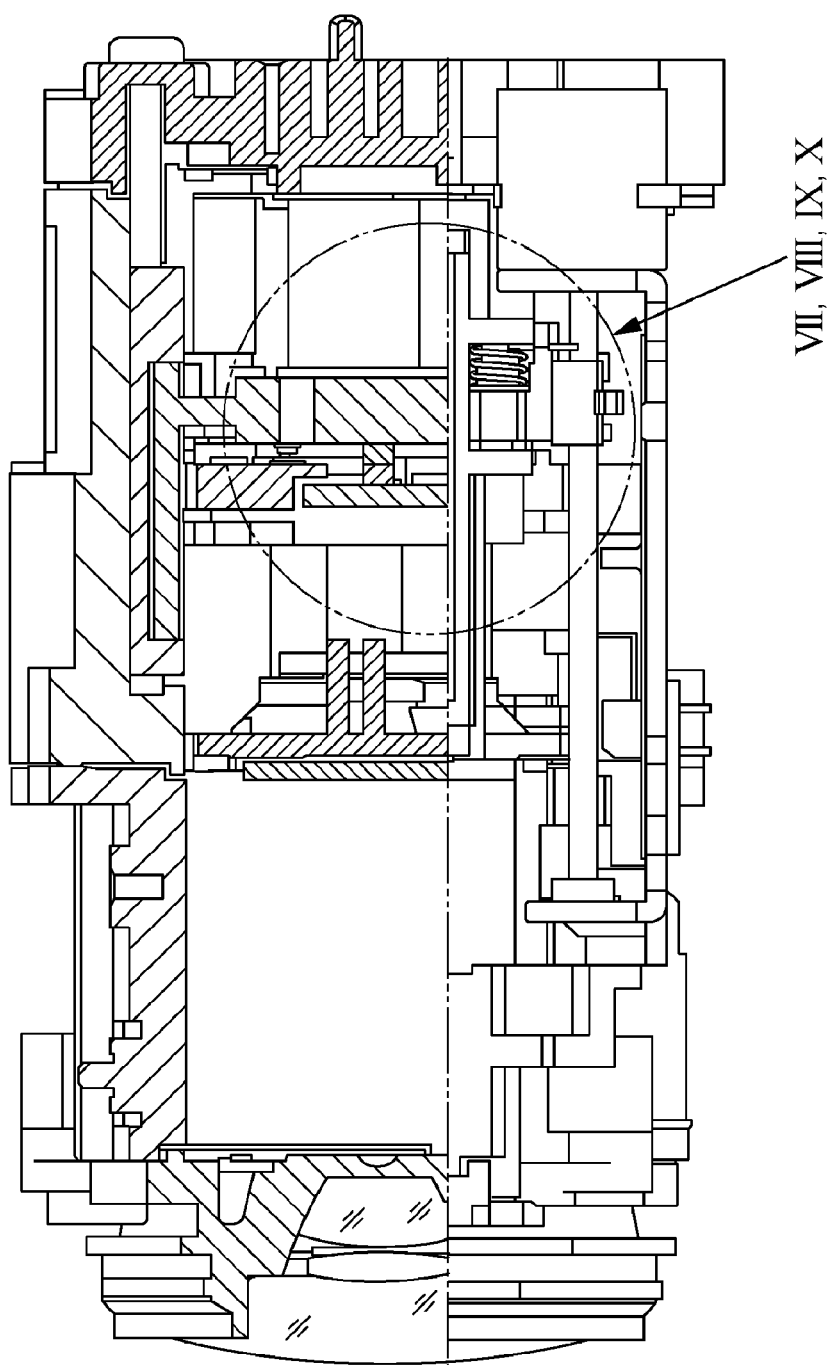
FIG. 5 is a cross-sectional view taken along line V-V in FIG. 4.
Figure 6:
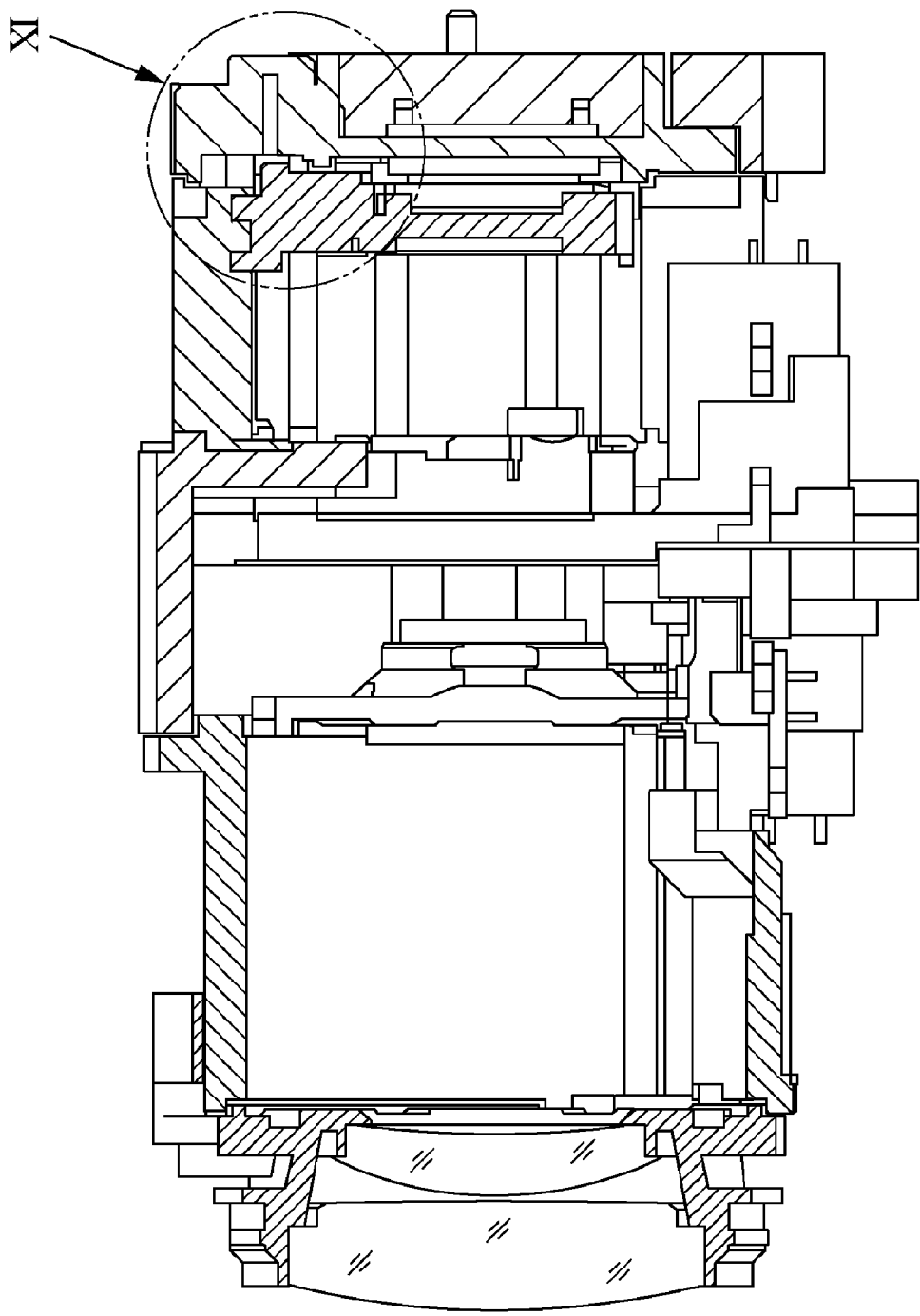
FIG. 6 is a cross-sectional view taken along line VI-VI in FIG. 4.
Figure 7A:
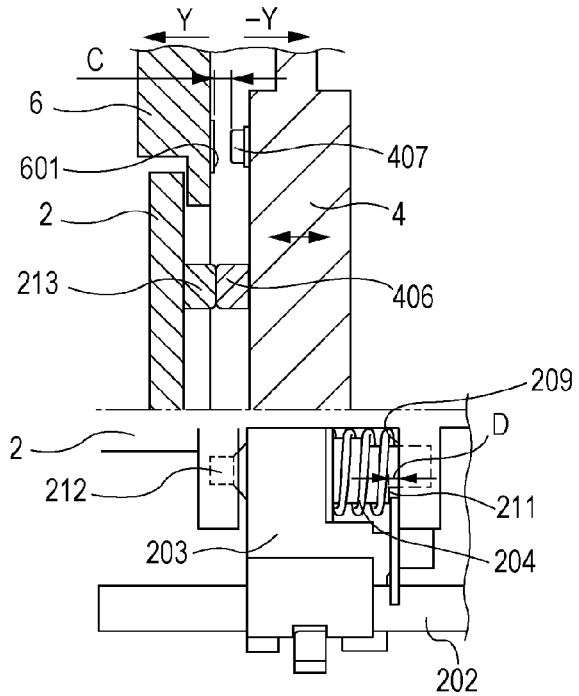
FIG. 7A is a detailed view showing a structure of shock absorption in portion VII in FIG. 5.
Figure 7B:
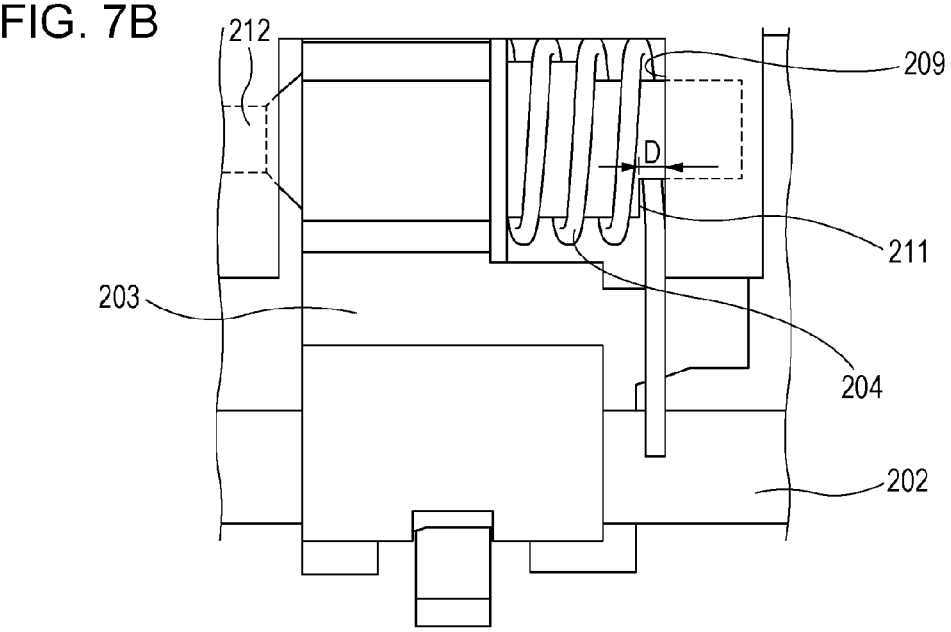
FIG. 7B is a detailed view showing an area around a distance D in FIG. 7A.
Figure 8:
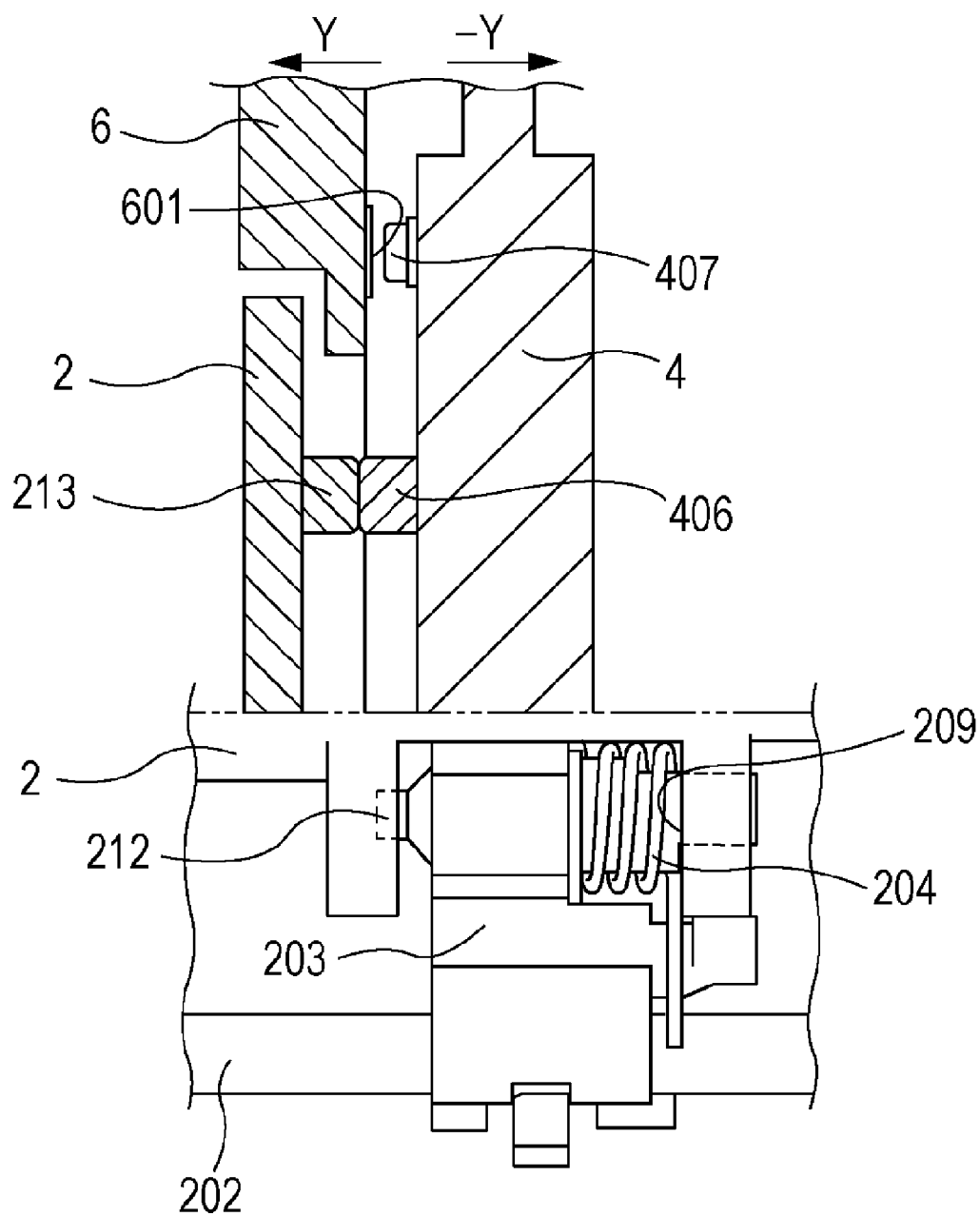
FIG. 8 is a detailed view showing the structure during shock absorption in portion VIII in FIG. 5.
Figure 9:
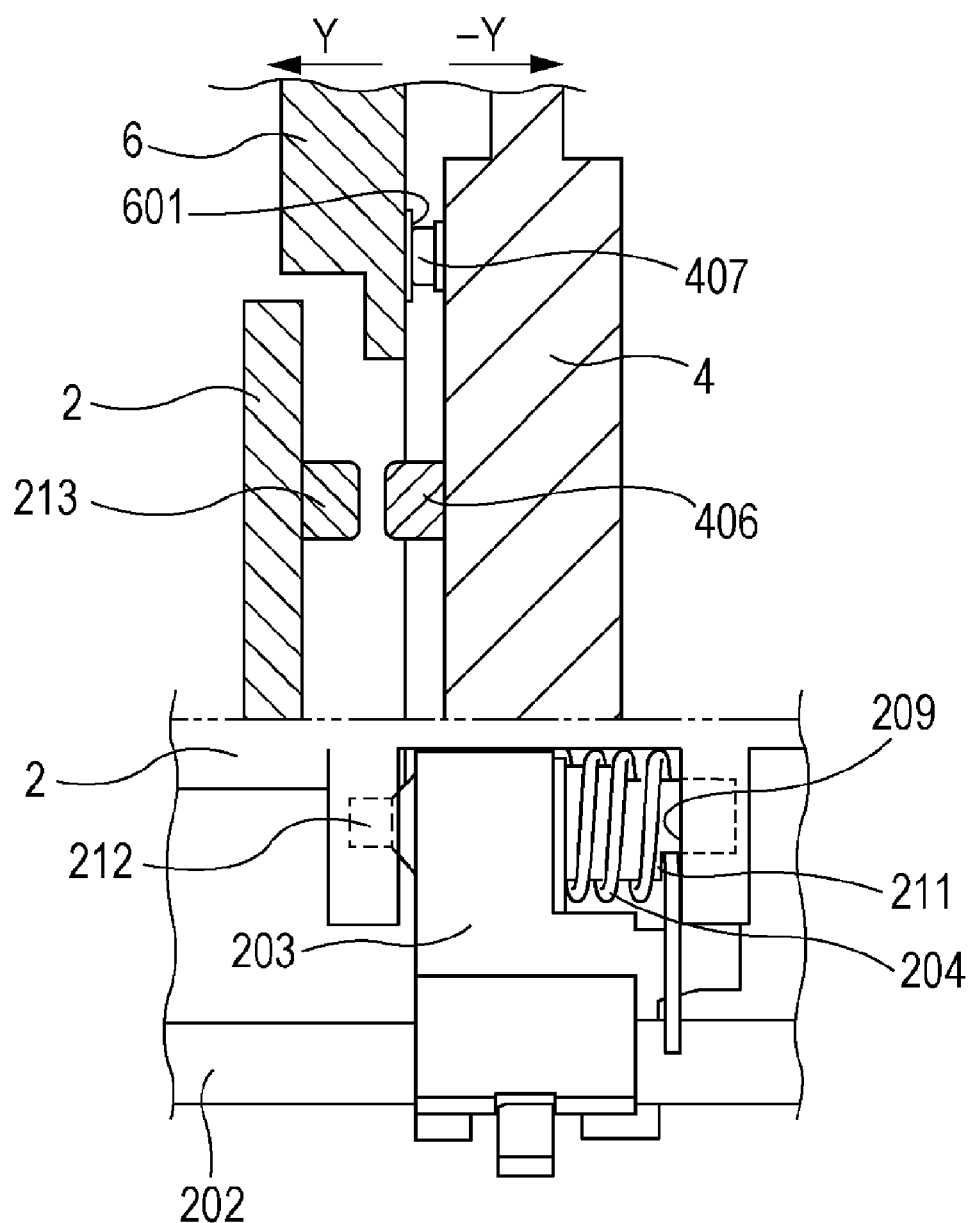
FIG. 9 is a detailed view showing a mechanical-end contact portion in portion IX in FIG. 5.

Described next with reference to FIGS. 4 to 9 is a structure that reduces collision sound when the focus movable frame (second movable frame) 4 moves to the mechanical end at the object side, i.e., in the arrow Y direction while being accelerated in the nonenergized state, in which the position of the focus movable frame 4 is not held in the optical-axis direction. FIG. 4 is a front view showing the lens barrel. FIG. 5 is a cross-sectional view taken along line V-V in FIG. 4. FIG. 6 is a cross-sectional view taken along line VI-VI in FIG. 4. FIG. 7A is a detailed view showing a structure of shock absorption in portion VII in FIG. 5. FIG. 7B is an enlarged explanatory view showing an area around a distance D in FIG. 7A. FIG. 8 is a detailed view showing the structure during shock absorption in portion VIII in FIG. 5. FIG. 9 is a detailed view showing a mechanical-end contact portion in portion IX in FIG. 5.

Referring to FIGS. 7A, 7B, 8, and 9, a stopper 213 is provided at the variator movable frame 2. A contact surface 209 is provided at the variator movable frame 2 and contacts the torsion coil spring (shock-absorbing portion) 204. A wall portion 211 is provided at the rack 203. A protrusion 212 is also provided at the rack 203. The protrusion 212 is fitted into the variator movable frame 2. A contact surface 601 is provided at the rear barrel 6. Also, the focus movable frame 4 includes a protruding portion 406 and a contact portion 407. The stopper 213 provided at the variator movable frame 2 contacts the protruding portion 406 provided at the focus movable frame 4. The contact portion 407 provided at the focus movable frame 4 contacts the contact surface 601 provided at the rear barrel 6. Referring to FIG. 9, a position at which the contact portion 407 contacts the contact surface 601 is the mechanical end (origin position) of the focus movable frame 4 at the object side, i.e., in the arrow Y direction.

When the protruding portion 406 contacts the stopper 213, and the variator movable frame 2 moves in the arrow Y direction (in the optical-axis direction toward a side opposite the focus movable frame 4), the contact surface 209 provided at the variator movable frame 2 moves in the arrow Y direction (in the optical-axis direction toward the variator movable frame 2). The rack 203 is positioned and held by meshing with the lead screw 202. Thus, the variator movable frame 2 can move to a position at which the wall portion 211 provided at the rack 203 contacts the contact surface 209 of the variator movable frame 2. The protrusion 212 provided at the rack 203 has a length in the optical-axis direction so that the rack 203 is not detached from the variator movable frame 2 even if the wall portion 211 contacts the contact surface 209 provided at the variator movable frame 2. Thus, if a force in the arrow Y direction is exerted on the variator movable frame 2 even after the wall portion 211 contacts the contact surface 209, a load in the arrow Y direction is also exerted on the rack 203. This may cause a tooth of the rack 203 to be skipped.

When an operation for the nonenergized state (for example, an operation for turning OFF a power switch) is performed, a control unit (not shown) such as a microcomputer which is arranged in a camera body or a lens barrel controls the variator movable frame 2 to move in an arrow −Y direction as shown in FIG. 7A. Then, the protruding portion 406 provided at the focus movable frame 4 contacts the stopper 213 provided at the variator movable frame 2 before the contact surface 601 provided at the rear barrel 6 contacts the contact portion 407 provided at the focus movable frame 4. In other words, when the operation for the nonenergized state is performed, the variator movable frame 2 is controlled by the control unit to move towards the focus movable frame 4, and to move into the movable range of the focus movable frame 4. After the variator movable frame 2 moves into the movable range of the focus movable frame 4, the application of electricity to the stepping motor 201 that moves the focus movable frame 4 and to the drive coil 401 of the voice coil motor that moves the focus movable frame 4 is stopped.

In this state (nonenergized state), if the camera body is inclined in the arrow Y direction from the horizontal state, the focus movable frame 4 moves in the arrow Y direction. Then, the protruding portion 406 of the focus movable frame 4 contacts the stopper 213 of the variator movable frame 2 before the contact surface 601 of the rear barrel 6 contacts the contact portion 407 of the focus movable frame 4. Since the rack 203 attached to the variator movable frame 2 meshes with the lead screw 202, the variator movable frame 2 has the self-holding force.

Referring to FIG. 8, a shock, that is, a force in the arrow Y direction generated when the protruding portion 406 of the focus movable frame 4 contacts the stopper 213 of the variator movable frame 2 causes the variator movable frame 2 in the arrow Y direction together with the focus movable frame 4. When the variator movable frame 2 moves in the arrow Y direction, the contact surface 209 of the variator movable frame 2 that contacts the torsion coil spring (shock-absorbing portion) 204 moves in the arrow Y direction. However, since the rack 203 attached to the variator movable frame 2 meshes with the lead screw 202, the rack 203 does not move. Thus, the torsion coil spring 204 provided between the rack 203 and the contact surface 209 provided at the variator movable frame 2 is compressed. The position of the variator movable frame 2 is restored to the position immediately before the protruding portion 406 contacts the stopper 213 by a restoring force of the compressed torsion coil spring 204 to the original form, that is, a reactive force of the torsion coil spring 204 in the arrow −Y direction. The shock occurring when the protruding portion 406 contacts the stopper 213 is absorbed by elastic deformation of the torsion coil spring (shock-absorbing portion) 204 provided between the variator movable frame 2 and the rack 203. Also, an elastic force generated by the elastic deformation of the torsion coil spring 204 reduces the speed of the focus movable frame 4. Accordingly, the collision sound is reduced. Also, the following expression is established:

$$D > C,$$

where D is a distance between the contact surface 209 and the wall portion 211 immediately before the protruding portion 406 of the focus movable frame 4 contacts the stopper 213 of the variator movable frame 2 when the variator movable frame 2 is stopped at a position in the nonenergized state of the variator movable frame 2 as shown in FIG. 7A, and C is a distance between the contact surface 601 and the contact portion 407. Namely, the distance D is larger than the distance C.

Accordingly, even if the variator movable frame 2 moves in the arrow Y direction together with the focus movable frame 4, the contact portion 407 contacts the contact surface 601, which is the mechanical end of the focus movable frame 4, before the wall portion 211 of the rack 203 contacts the contact surface 209 of the variator movable frame 2. Thus, a load, which causes a tooth of the rack 203 to be skipped, is not exerted on the rack 203 in the arrow Y direction.

As described above, the collision sound as a result of the movement of the focus movable frame 4 in the nonenergized state is reduced by the elastic deformation of the torsion coil spring 204. To correctly detect the reference position of the focus movable frame 4, i.e., to correctly detect the origin position of the focus motor for control, the contact surface 601 of the rear barrel 6, the contact surface which is the mechanical end of the focus movable frame 4, has to contact the contact portion 407 of the focus movable frame 4.

In this embodiment, when the state is changed from the nonenergized state to the energized state, a control unit (not shown) controls the variator movable frame 2 to move outside the movable range of the focus movable frame 4 in the arrow Y direction as shown in FIG. 9. Then, the contact surface 601 of the rear barrel 6, the contact surface which is the mechanical end of the focus movable frame 4, can contact the contact portion 407 of the focus movable frame 4. Accordingly, upon the application of electricity to the coil, the focus movable frame 4 moves in the arrow Y direction and the contact portion 407 of the focus movable frame 4 contacts the contact surface 601 which is the mechanical end. The MR sensor 405 detects this state as the reference position (origin position).

As described above, in this embodiment, the collision sound of the focus motor is reduced in the nonenergized state, and the origin position of the focus motor for control is correctly detected in the energized state. Thus, a driving amount of the focus motor from the origin position, that is, a moving distance of the focus movable frame 4 from the reference position can be correctly and stably detected by using the MR sensor 405 and the sensor magnet 404. Further, since the torsion coil spring 204, which is an existing part, serves as the shock-absorbing portion, the collision sound can be reduced with a simple configuration without an increase in the number of parts.

In this embodiment, the protruding portion 406 is provided at the focus movable lens 4. Alternatively, the protruding portion 406 may be omitted, and the stopper 213 may be elongated toward the focus movable frame 4, so that the stopper 213 contacts the focus movable frame 4 before the contact surface 601 contacts the contact portion 407. Still alternatively, even the stopper 213 may be omitted, and the variator movable frame 2 may move into the movable range of the focus movable frame 4. In this case, the focus movable frame 4 may or may not include the protrusion 406.

The idea of the present invention is that at least part of the variator movable frame 2 is positioned within the movable range of the focus movable frame 4, the variator movable frame 2 contacts the focus movable frame 4 before the contact surface 601 contacts the contact portion 407, and hence the shock-absorbing portion 204 absorbs the shock by the contact. Therefore, any modification can be made as long as the modification is within the scope of this idea.

The shock-absorbing portion is not limited to the torsion coil spring 204. For example, a shock-absorbing portion may be provided at a focus movable frame 4. A configuration and an action when the shock-absorbing portion is provided at the focus movable frame 4 will be described below.

Figure 10:
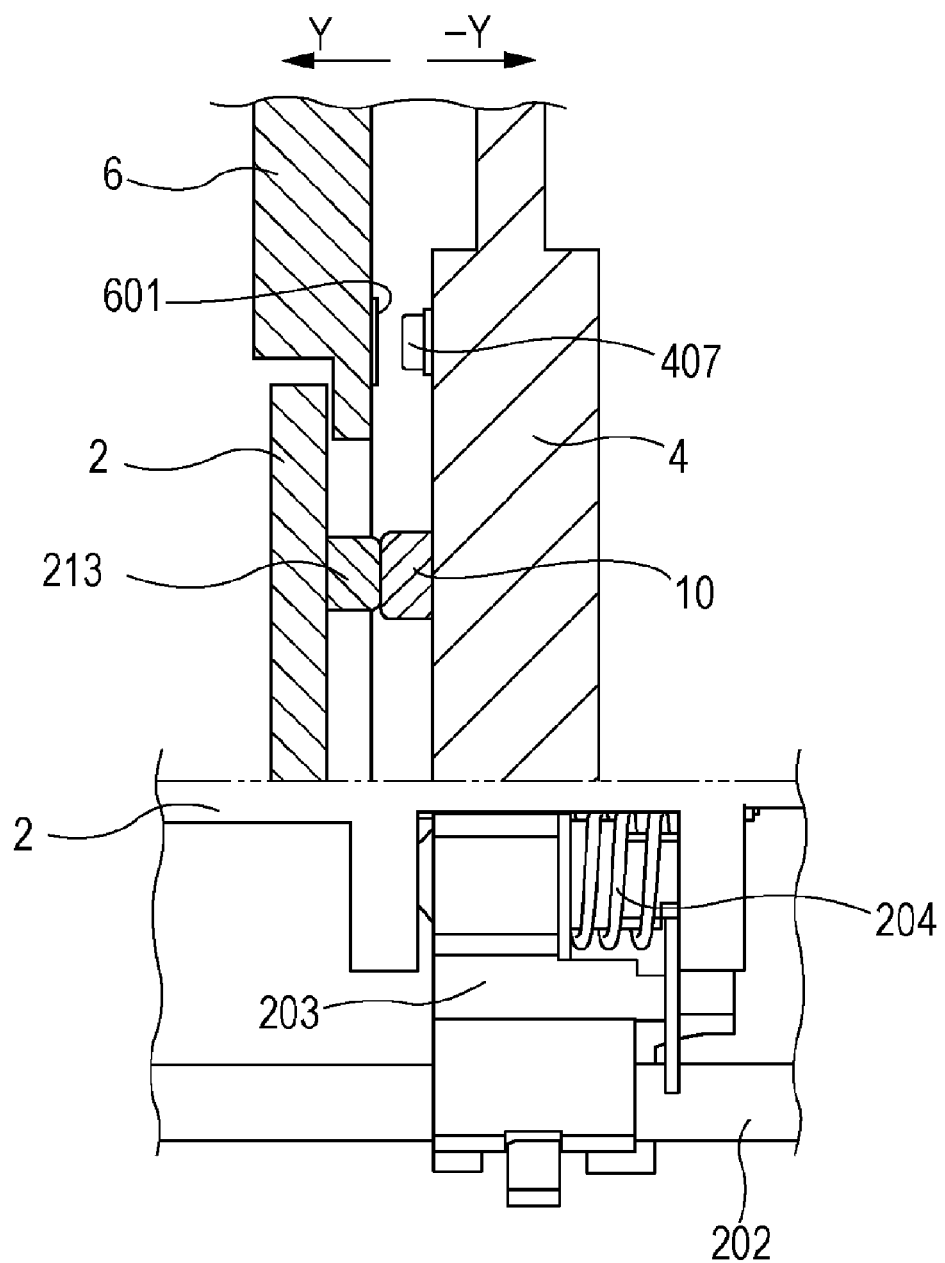
FIG. 10 is a detailed view showing a structure of shock absorption in portion X in FIG. 5.

FIG. 10 is a detailed view showing a structure of shock absorption provided at the focus movable frame 4 in portion X in FIG. 5. Referring to FIG. 10, an elastic member 10 is provided at the focus movable frame 4 such that the elastic member 10 contacts the stopper 213 provided at the variator movable frame 2.

When the operation for the nonenergized state (for example, the operation for turning OFF the power switch) is performed, a control unit (not shown) controls the variator movable frame 2 to move in the arrow −Y direction as shown in FIG. 10. Then, the elastic member 10 provided at the focus movable frame 4 contacts the stopper 213 provided at the variator movable frame 2 before the contact surface 601 provided at the rear barrel 6 contacts the contact portion 407 provided at the focus movable frame 4. In other words, when the operation for the nonenergized state is performed, the variator movable frame 2 moves into the movable range of the focus movable frame 4. After the variator movable frame 2 moves into the movable range of the focus movable frame 4, the application of electricity to the stepping motor 201 that moves the focus movable frame 4 and to the drive coil 401 of the voice coil motor that moves the focus movable frame 4 is stopped.

In this state (nonenergized state), if the camera body is inclined in the arrow Y direction from the horizontal state, the focus movable frame 4 moves in the arrow Y direction. Then, the elastic member 10 of the focus movable frame 4 contacts the stopper 213 of the variator movable frame 2 before the contact surface 601 of the rear barrel 6 contacts the contact portion 407 of the focus movable frame 4. Since the rack 203 attached to the variator movable frame 2 meshes with the lead screw 202, the variator movable frame 2 has the self-holding force. A shock, that is, a force in the arrow Y direction generated when the elastic member 10 of the focus movable frame 4 contacts the stopper 213 of the variator movable frame 2 is reduced by elastic deformation of the elastic member 10. Also, an elastic force generated by the elastic deformation of the elastic member 10 reduces the speed of the focus movable frame 4. Accordingly, the collision sound is reduced.

In addition, a shock-absorbing portion may be provided at the focus movable frame 4 at a side near the CCD holder 7, i.e., at a mechanical-end side in the arrow −Y direction to reduce the collision sound as a result of the movement of the focus movable frame 4 in the nonenergized state.

Figure 11:
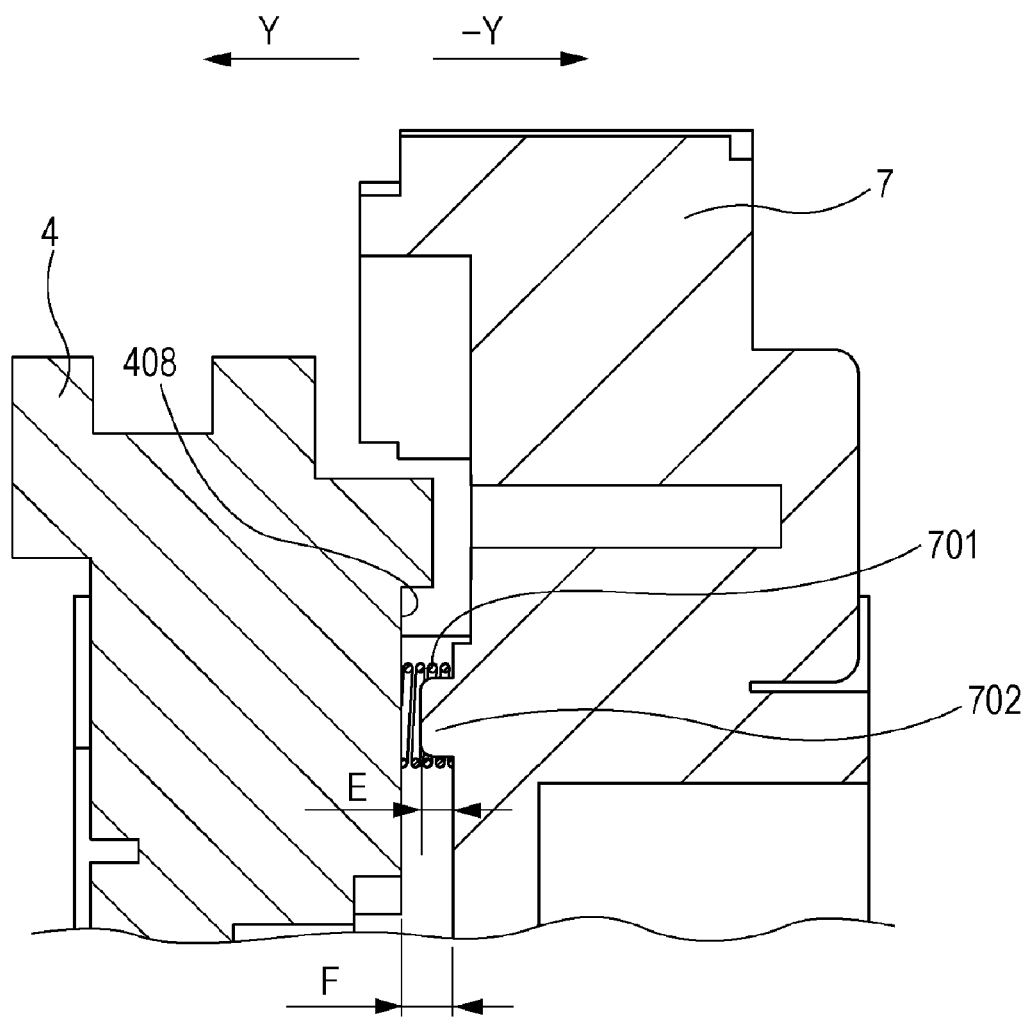
FIG. 11 is a detailed view showing a structure of shock absorption in portion XI in FIG. 6.

FIG. 11 is a detailed view showing the structure of shock absorption in portion XI in FIG. 6. Referring to FIG. 11, a state in which a contact portion 702 provided at the CCD holder 7 contacts a contact surface 408 provided at the focus movable frame 4 defines a mechanical end of the focus movable frame 4 in a direction toward the CCD holder 7, i.e., in the arrow −Y direction. A coil spring 701 is attached to the CCD holder 7 by a certain method (not shown). The coil spring 701 has a longer natural length F than a length E of the contact portion 702. That is, the length of the coil spring 701 is determined such that the contact surface 408 contacts the coil spring 701 before the contact surface 408 contacts the contact portion 702. Also, the length of the coil spring 701 is determined such that the length does not interfere with the movable range of the focus movable frame 4 for focusing. Accordingly, the contact surface 408 contacts the coil spring 701 before the contact portion 702, which is the mechanical end of the focus movable frame 4, contacts the contact surface 408. Even if the focus movable frame 4 moves to the mechanical end in the direction toward the CCD holder 7, i.e., in the arrow −Y direction in the nonenergized state, a shock occurring at this time is absorbed by elastic deformation of the coil spring 701, and collision sound generated at the mechanical end can be reduced.

In this embodiment, the coil spring 701, which is the shock-absorbing portion, is arranged near the contact portion at the mechanical end. Alternatively, the coil spring 701 may be arranged at other position of the CCD holder 7 as long as the coil spring 701, which is the shock-absorbing portion, contacts the focus movable frame 4 before the contact portion 702 contacts the contact surface 408, and the coil spring 701 absorbs the shock. Still alternatively, the coil spring 701 may be arranged at the focus movable frame 4. In this embodiment, the protruding portion 406 and the stopper 213 may be a shock-absorbing portion. Also, the shapes of the stopper 213, the protruding portion 406, and the contact surface 601 and the contact portion 407, etc., may be any shapes as long as the stopper 213, the protruding portion 406, and the contact surface 601 and the contact portion 407, etc. have the aforementioned functions. Further, the shock-absorbing portion is not limited to the coil spring, and may be a leaf spring or a rubber member as long as the shock-absorbing portion can absorb the shock as a result of the contact between the protruding portion 406 and the stopper 213. As described above, since the shock-absorbing portion is provided in this embodiment, the collision sound at both the mechanical ends of the focus movable frame 4 can be reduced.

Second Embodiment

Figure 12:
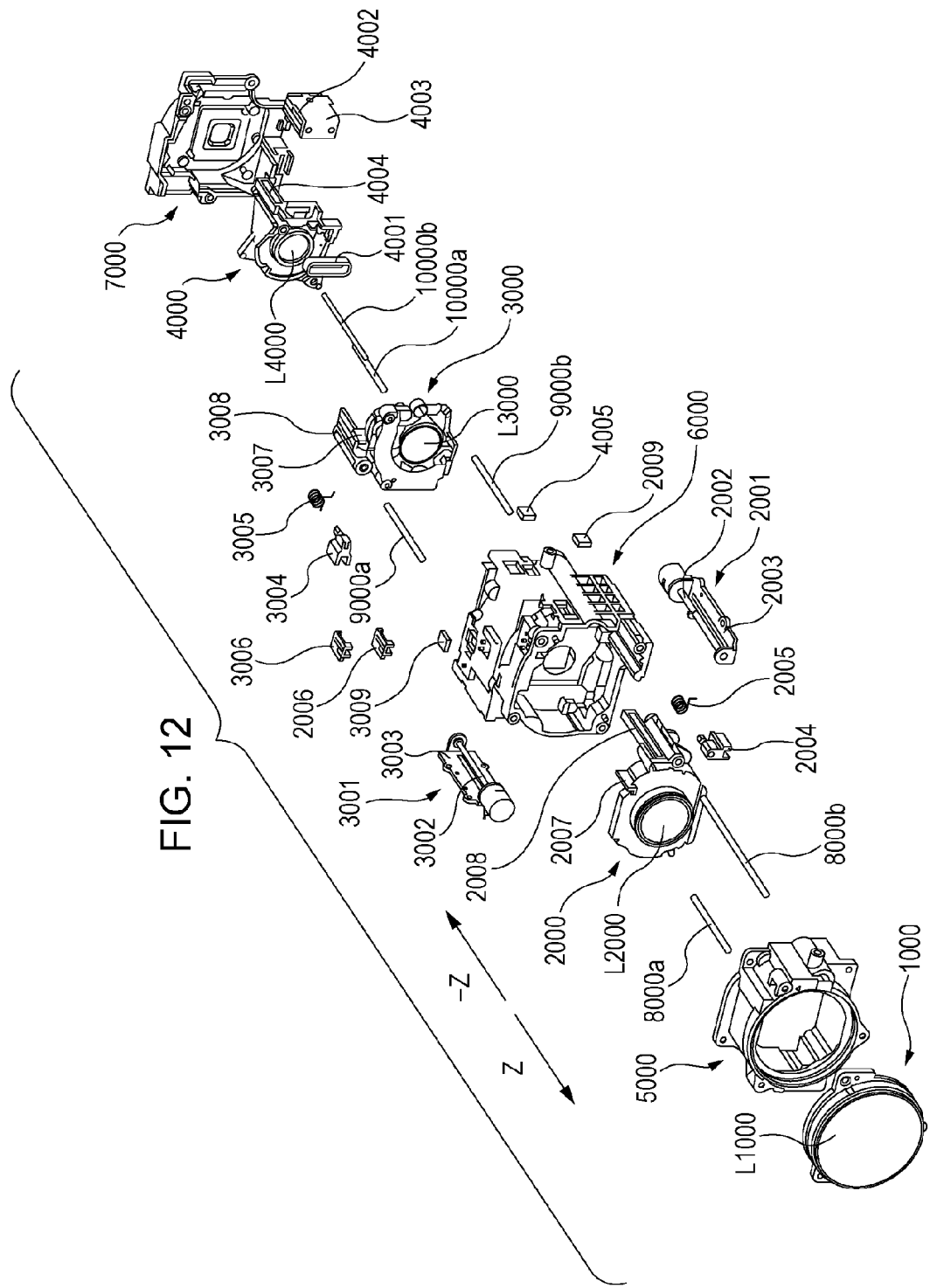
FIG. 12 is an exploded perspective view showing a lens barrel provided in a camera according to a second embodiment of the present invention.
Figure 13:
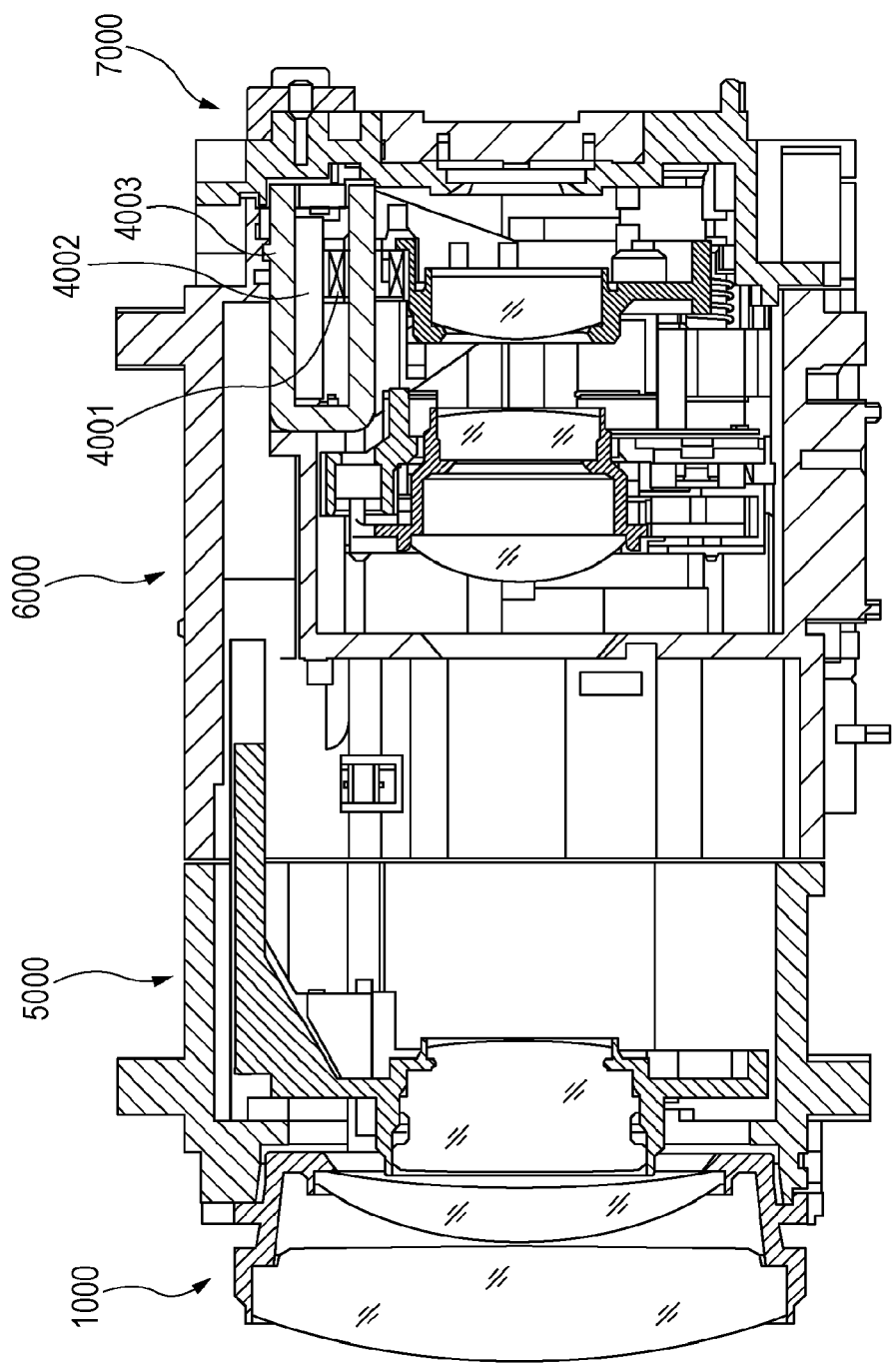
FIG. 13 is a cross-sectional view showing the lens barrel of FIG. 12.

FIGS. 12 and 13 are explanatory views showing a lens barrel L according to a second embodiment of the present invention. An image taking optical system is a zoom optical system (zoom lens system) including four lens units. FIGS. 12 and 13 illustrate a first lens unit L1000 and a second lens unit L2000 that performs zooming when the second lens unit L2000 moves in an optical-axis direction. A third lens unit L3000 shifts in a direction orthogonal to the optical axis of the image taking optical system (hereinafter, referred to as orthogonal-to-optical-axis direction) for image stabilization that reduces image blur. The third lens unit L3000 is movable in the optical-axis direction. A fourth lens unit L4000 performs focusing when the fourth lens unit L4000 moves in the optical-axis direction. A first lens frame 1000 holds the first lens unit L1000. A variator movable frame 2000 holds the second lens unit L2000. A shift movable frame 3000 holds the third lens unit L3000. A focus movable frame 4000 holds the fourth lens unit L4000. Also, a fixing barrel 5000 and a rear barrel 6000 are provided. A rear end of the fixing barrel 5000 is coupled with the rear barrel 6000, and a front end of the fixing barrel 5000 is fixed to the first lens frame 1000. Hence, the fixing barrel 5000 fixes the first lens unit L1000 at a predetermined position. A CCD holder 7000 holds an image pickup element (photoelectric conversion element), such as a CCD sensor or a CMOS sensor (not shown). The CCD holder 7000 is fixed to the rear barrel 6000.

A first guide bar 8000a and a second guide bar 8000b have both ends that are held by the fixing barrel 5000 and the rear barrel 6000. Also, a third guide bar 9000a and a fourth guide bar 9000b, as well as a fifth guide bar 10000a and a sixth guide bar 10000b have both ends that are held by the rear barrel 6000 and the CCD holder 7000. The variator movable frame 2000 is supported by the first and second guide bars 8000a and 8000b movably in the optical-axis direction. The shift movable frame 3000 is supported by the third and fourth guide bars 9000a and 9000b movably in the optical-axis direction. An inside part of the shift movable frame 3000 moves in a direction perpendicular to the optical axis for image stabilization. The shift movable frame 3000 is held by the rear barrel 6000. Also, a light quantity adjusting unit (not shown) is fixed to the rear barrel 6000. The light quantity adjusting unit changes a light quantity that enters the image taking optical system. For example, the light quantity adjusting unit may change the diameter of an aperture by moving at least two diaphragm blades in the orthogonal-to-optical-axis direction. The light quantity adjusting unit also causes a gradation ND filter (not shown) to be advanced to and retracted from an optical path independently from the diaphragm blades. The focus movable frame 4000 is supported by the fifth and sixth guide bars 10000a and 10000b movably in the optical-axis direction.

Next, a configuration of a drive unit (variator drive unit) that moves the variator movable frame 2000 (second lens unit L2000) will be described. A stepping motor (variator drive unit) 2001 drives the variator movable frame 2000 in the optical-axis direction. An output shaft of the stepping motor 2001 has a lead screw 2002. The stepping motor 2001 is fixed to the rear barrel 6000 through a support member 2003. The lead screw 2002 meshes with a rack (transmission portion) 2004 that is attached to the variator movable frame 2000. Hence, when electricity is applied to the stepping motor 2001 and the lead screw 2002 is rotated, the variator movable frame 2000 moves in the optical-axis direction through the rack 2004. Backlash between the rack 2004 and the variator movable frame 2000 is reduced by an urging force of a torsion coil spring (urging portion) 2005.

A zoom reset 2006 detects a reference position of the variator movable frame 2000. The zoom reset 2006 includes a photo-interrupter that detects a change between a light-shielding state and a light-transmitting state as a result of the movement of a light-shielding portion 2007 that is provided at the variator movable frame 2000. The zoom reset 2006 is fixed to the rear barrel 6000 through a substrate. The variator movable frame 2000 holds a sensor magnet 2008 that is magnetized to have multiple poles in the optical-axis direction. A MR sensor 2009 is fixed to the rear barrel 6000 at a position facing the sensor magnet 2008. The MR sensor 2009 reads a change in magnetic lines of force as a result of the movement of the sensor magnet 2008. With a signal from the MR sensor 2009, a moving distance of the variator movable frame 2000, that is, a moving distance of the second lens unit L2000 from the predetermined reference position can be detected.

Next, a configuration of a drive unit that moves the shift movable frame 3000 (third lens unit L3000) will be described. A stepping motor 3001 drives the shift movable frame 3000 in the optical-axis direction. An output shaft of the stepping motor 3001 has a lead screw 3002. The stepping motor 3001 is fixed to the rear barrel 6000 through a support member 3003. The lead screw 3002 meshes with a rack 3004 that is attached to the shift movable frame 3000. Hence, when electricity is applied to the stepping motor 3001 and the lead screw 3002 is rotated, the shift movable frame 3000 can move in the optical-axis direction. Backlash among the rack 3004, the shift movable frame 3000, the third and fourth guide bars 9000a and 9000b, and the lead screw 3002 is reduced by an urging force of a torsion coil spring 3005.

A zoom reset 3006 detects a reference position of the shift movable frame 3000. The zoom reset 3006 includes a photo-interrupter that detects a change between a light-shielding state and a light-transmitting state as a result of the movement of a light-shielding portion 3007 that is provided at the shift movable frame 3000. The zoom reset 3006 is fixed to the rear barrel 6000 through a substrate. The shift movable frame 3000 holds a sensor magnet 3008 that is magnetized to have multiple poles in the optical-axis direction. A MR sensor 3009 is fixed to the rear barrel 6000 at a position facing the sensor magnet 3008. The MR sensor 3009 reads a change in magnetic lines of force as a result of the movement of the sensor magnet 3008. With a signal from the MR sensor 3009, a moving distance of the shift movable frame 3000, that is, a moving distance of the third lens unit L3000 from the predetermined reference position can be detected.

A drive coil 4001, a drive magnet 4002, and a yoke member 4003, which closes magnetic flux, form a focus motor (focus drive unit) that drives the fourth lens unit L4000 in the optical-axis direction. The drive coil 4001, the drive magnet 4002, and the yoke member 4003 configure a voice coil motor. The drive coil 4001 is attached to the focus movable frame 4000. The drive magnet 4002 is provided within the yoke member 4003. The yoke member 4003 is attached to the CCD holder 7000. When electric current flows to (or when electricity is applied to) the drive coil 4001, a Lorentz force is generated as a result of repulsion between mutual magnetic lines of forces of the drive magnet 4002 and the drive coil 4001. The Lorentz force drives the focus movable frame 4000 and the fourth lens unit L4000 held by the focus movable frame 4000 in the optical-axis direction.

The focus movable frame 4000 holds a sensor magnet 4004 that is magnetized to have multiple poles in the optical-axis direction. A MR sensor 4005 is fixed to the rear barrel 6000 at a position facing the sensor magnet 4004 provided at the focus movable frame 4000. The MR sensor 4005 reads a change in magnetic lines of force as a result of the movement of the sensor magnet 4004. With a signal from the MR sensor 4005, a moving distance of the focus movable frame 4000, that is, a moving distance of the fourth lens unit L4000 from a predetermined reference position along the optical axis is detected. When electricity is applied to the drive coil 4001, the focus movable frame 4000 moves to an object side or an image side, that is, in an arrow Z direction that is parallel to the optical axis. The MR sensor 4005 detects a state in which the contact portion (mechanical end) 4006 of the focus movable frame 4000 contacts a contact portion 6001, as a reference position.

Next, a configuration of a focus drive unit that moves the focus movable frame 4000 (fourth lens unit L4000) will be described. The focus drive unit generates a Lorentz force when electricity is applied to the drive coil 4001 (hereinafter, referred to as energized state). The Lorentz force drives the focus movable frame 4000 in the optical-axis direction. When electricity is not applied to the drive coil 4001 (hereinafter, referred to as nonenergized state), a driving force is not generated for the focus movable frame 4000. In addition, the focus movable frame 4000 no longer has a self-holding force. Here, the self-holding force is a force by which the movable drive coil 4001 and the focus movable frame 4000 provided with the drive coil 4001 are stopped at the current position in the nonenergized state. In the nonenergized state, since the focus movable frame 4000 does not have the self-holding force, the focus movable frame 4000 can freely move along the guide bars 9000a and 9000b to both ends of the movable range in the optical-axis direction. Hence, if the posture of the camera is inclined with respect to the horizontal state in the nonenergized state, the focus movable frame 4000 moves to either of the mechanical ends while being accelerated.

Figure 14:
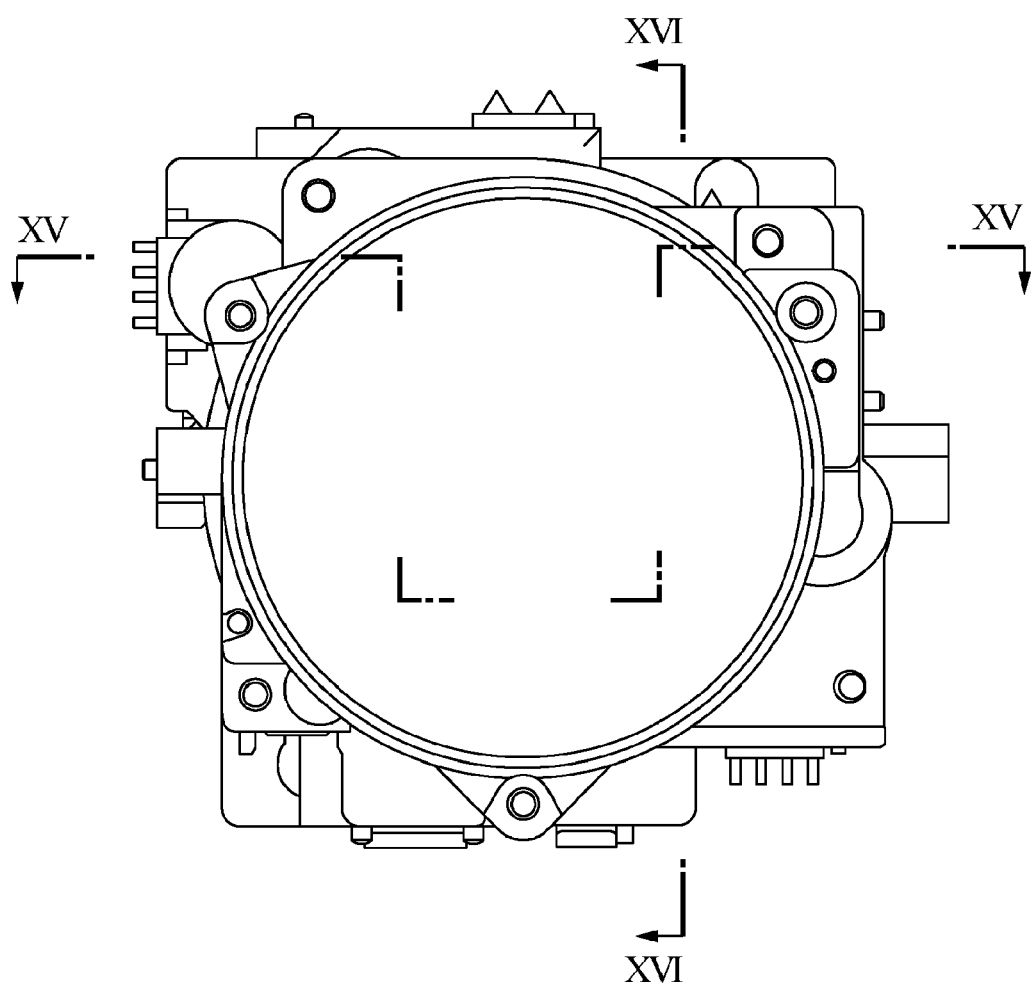
FIG. 14 is a front view showing the lens barrel of FIG. 13.
Figure 15:
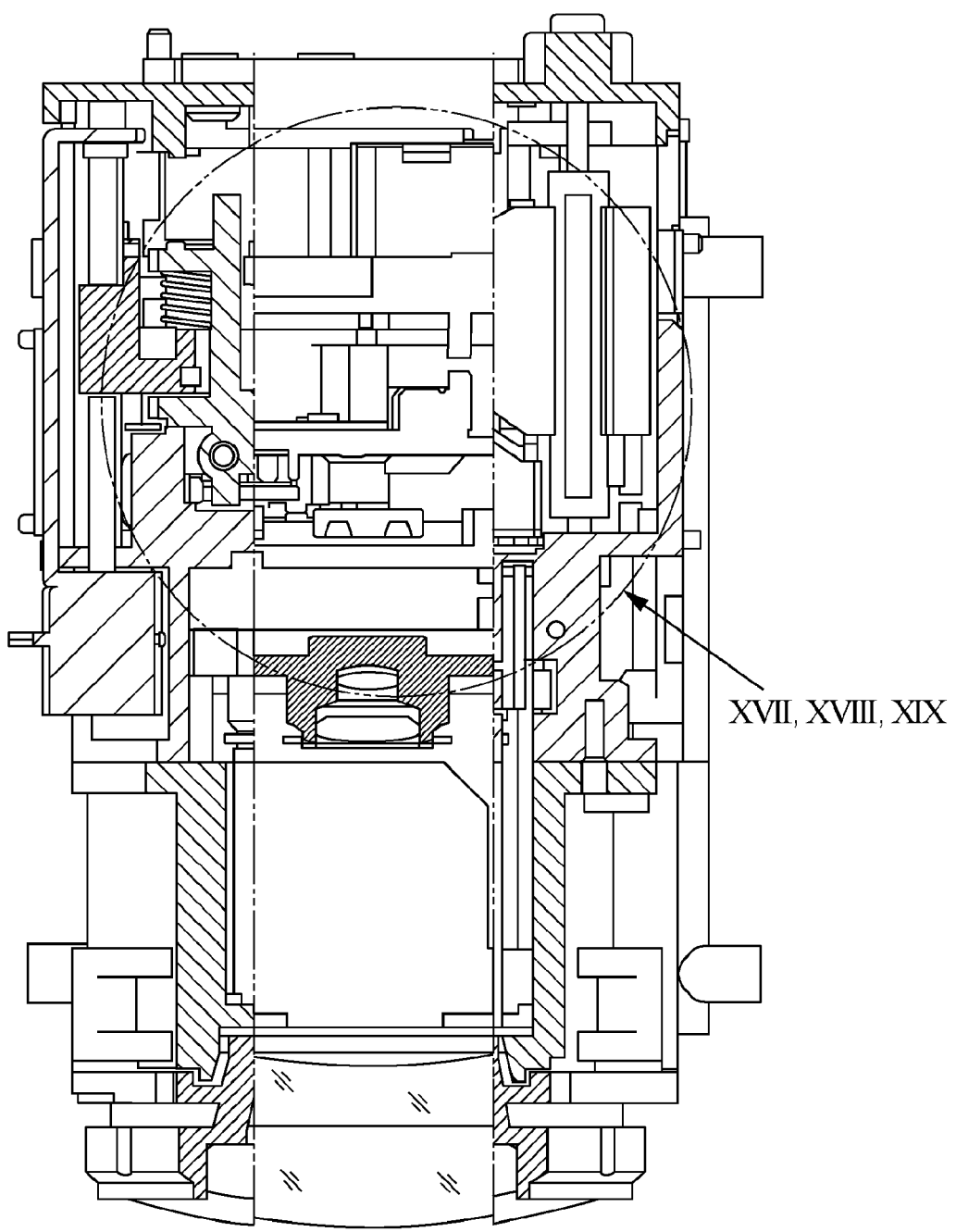
FIG. 15 is a cross-sectional view taken along line XV-XV in FIG. 14.
Figure 16:
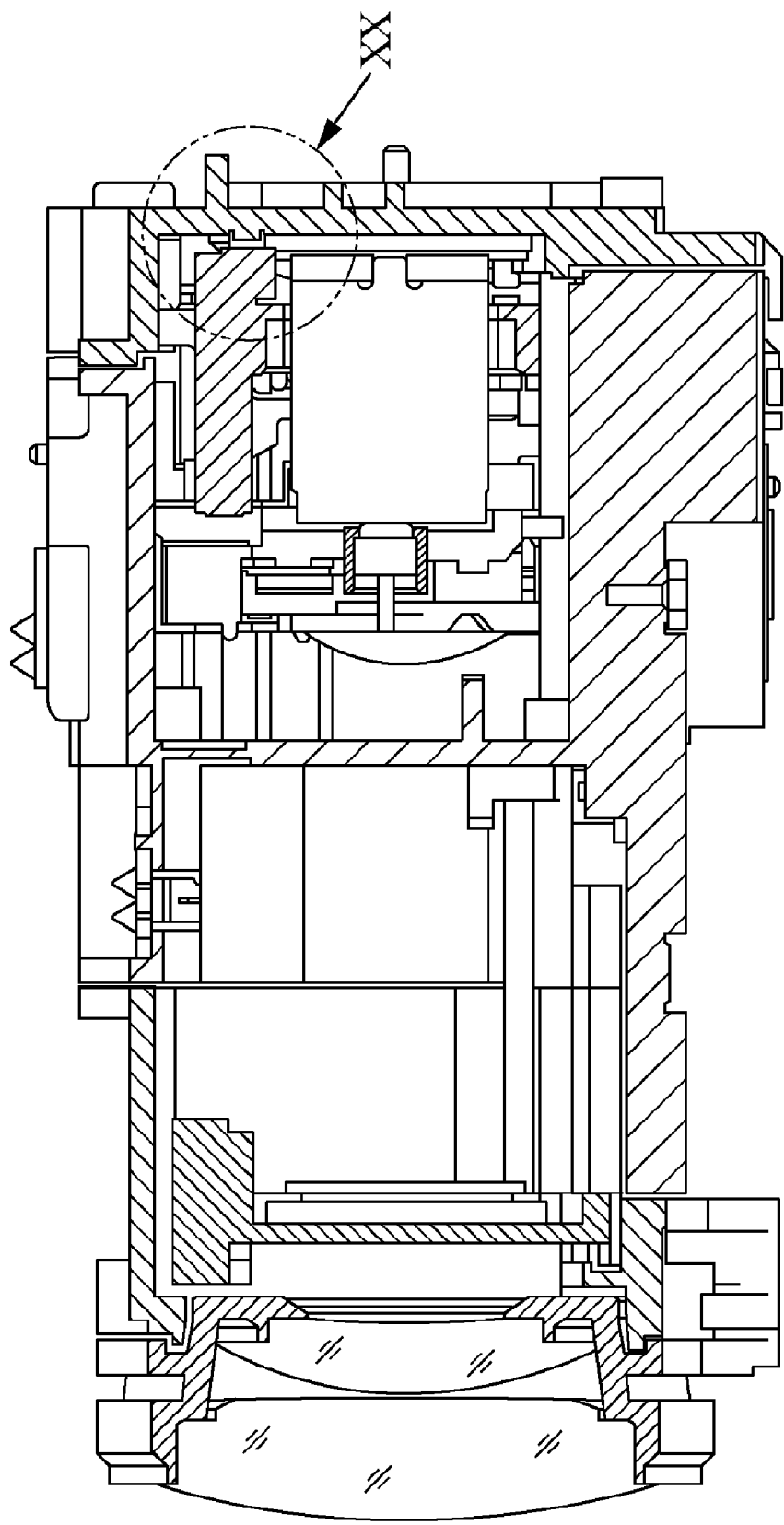
FIG. 16 is a cross-sectional view taken along line XVI-XVI in FIG. 14.
Figure 17:
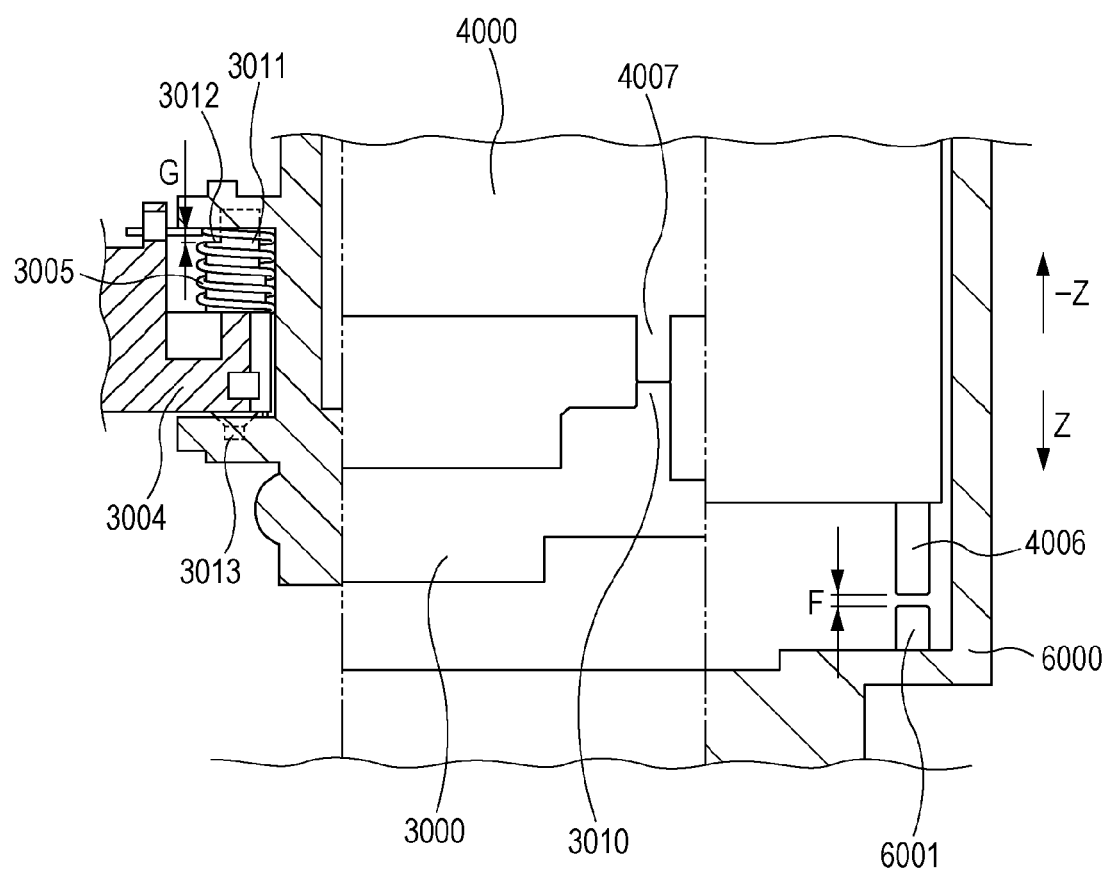
FIG. 17 is a detailed view showing a structure of shock absorption in portion XVII in FIG. 15.
Figure 18:
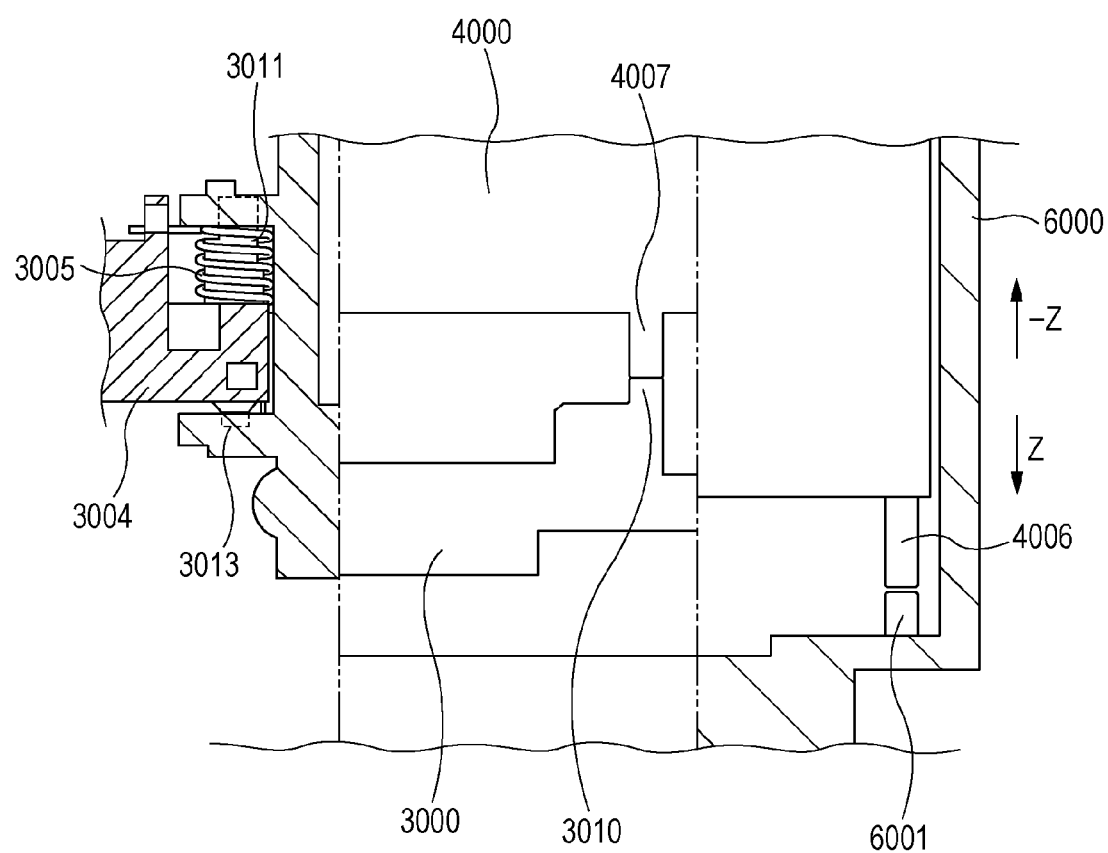
FIG. 18 is a detailed view showing the structure during shock absorption in portion XVIII in FIG. 15.
Figure 19:
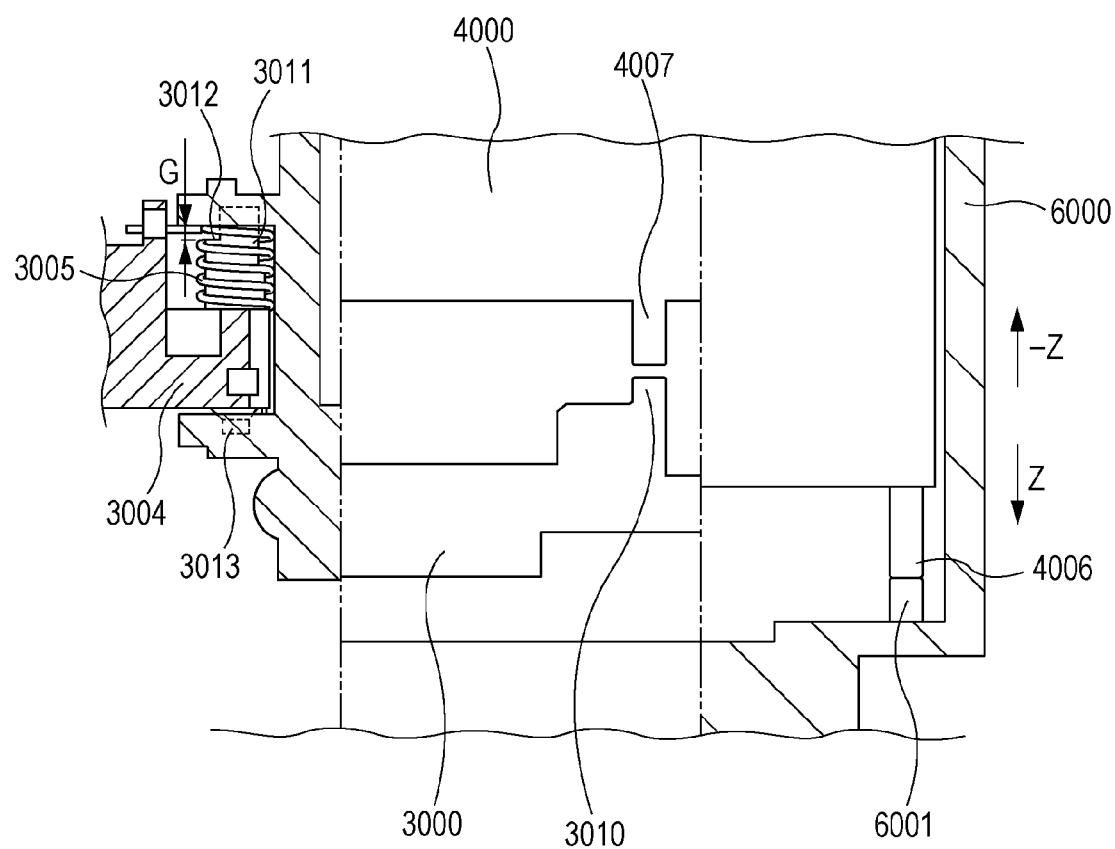
FIG. 19 is a detailed view showing a mechanical-end contact portion in portion XIX in FIG. 15.

Described next with reference to FIGS. 14 to 19 is a structure that reduces collision sound when the focus movable frame 4000 moves to the mechanical end at the object side, i.e., in the arrow Z direction while being accelerated in the nonenergized state. FIG. 14 is a front view showing the lens barrel according to the second embodiment of the present invention. FIG. 15 is a cross-sectional view taken along line XV-XV in FIG. 14. FIG. 16 is a cross-sectional view taken along line XVI-XVI in FIG. 14. FIG. 17 is a detailed view showing a structure of shock absorption in portion XVII in FIG. 15. FIG. 18 is a detailed view showing the structure during shock absorption in portion XVIII in FIG. 15. FIG. 19 is a detailed view showing a mechanical-end contact portion in portion XIX in FIG. 15.

Referring to FIGS. 17, 18, and 19, a stopper 3010 is provided at the shift movable frame 3000. A contact surface 3011 is provided at the shift movable frame 3000 and contacts the torsion coil spring (shock-absorbing portion) 3005. A wall portion 3012 is provided at the rack 3004. A protrusion 3013 is also provided at the rack 3004. A contact portion 6001 is provided at the rear barrel 6000. Also, the focus movable frame 4000 includes a mechanical-end contact portion 4006 and a protruding portion 4007. The stopper 3010 provided at the shift movable frame 3000 contacts the protruding portion 4007 provided at the focus movable frame 4000. The mechanical-end contact portion 4006 provided at the focus movable frame 4000 contacts the contact portion 6001 of the rear barrel 6000. A position at which the mechanical-end contact portion 4006 contacts the contact portion 6001 defines a mechanical end (origin position) of the focus movable frame 4000 at the object side, i.e., in the arrow Z direction.

When the shift movable frame 3000 moves in the arrow Z direction, the contact surface 3011 of the shift movable frame 3000 moves in the arrow Z direction. The rack 3004 is positioned and held by meshing with the lead screw 3002. Thus, the shift movable frame 3000 can move to a position at which the wall portion 3012 provided at the rack 3004 contacts the contact surface 3011 of the shift movable frame 3000. The protrusion 3013 has a length so that the rack 3004 is not detached from the shift movable frame 3000 even if the wall portion 3012 contacts the contact surface 3011. Thus, if a force in the arrow Z direction is exerted on the shift movable frame 3000 even after the wall portion 3012 contacts the contact surface 3011, a load in the arrow Z direction is also exerted on the rack 3004. This may cause a tooth of the rack 3004 to be skipped.

When an operation for the nonenergized state (for example, an operation for turning OFF a power switch) is performed, the protruding portion 4007 of the focus movable frame 4000 contacts the stopper 3010 of the shift movable frame 3000 before the contact portion 6001 of the rear barrel 6000 contacts the mechanical-end contact portion 4006. That is, a control unit (not shown) controls such that the shift movable frame 3000 moves in an arrow −Z direction into the movable range of the focus movable frame 4000. After the shift movable frame 3000 moves into the movable range of the focus movable frame 4000, the application of electricity to the stepping motor 3001 that moves the shift movable frame 3000 and to the drive coil 4001 of the voice coil motor that moves the focus movable frame 4000 is stopped.

Referring to FIG. 17, in the nonenergized state, if the camera body is inclined in the arrow Z direction from the horizontal state, the focus movable frame 4000 that does not have a self-holding force moves in the arrow Z direction. Then, the protruding portion 4007 contacts the stopper 3010 before the contact portion 6001 of the rear barrel 6000 contacts the mechanical-end contact portion 4006. Since the rack 3004 attached to the shift movable frame 3000 meshes with the lead screw 3002, the shift movable frame 3000 has a self-holding force. Referring to FIG. 18, a shock, that is, a force in the arrow Z direction generated when the protruding portion 4007 contacts the stopper 3010 causes the shift movable frame 3000 to move in the arrow Z direction together with the focus movable frame 4000.

When the shift movable frame 3000 moves in the arrow Z direction, the contact surface 3011 of the shift movable frame 3000 against the torsion coil spring 3005 moves in the arrow Z direction. However, since the rack 3004 attached to the shift movable frame 3000 meshes with the lead screw 3002, the rack 3004 does not move. Thus, the torsion coil spring 3005 provided between the rack 3004 and the contact surface 3011 provided at the shift movable frame 3000 is compressed. The position of the shift movable frame 3000 is restored to the position immediately before the contact against the protruding portion 4007 by a restoring force of the compressed torsion coil spring 3005 to the original form, that is, a reactive force of the torsion coil spring 3005 in the arrow −Z direction. The shock occurring when the protruding portion 4007 of the focus movable frame 4000 contacts the stopper 3010 of the shift movable frame 3000 is absorbed by elastic deformation of the torsion coil spring 3005 provided between the shift movable frame 3000 and the rack 3004. Also, an elastic force generated by the elastic deformation of the torsion coil spring 3005 reduces the speed of the focus movable frame 4000. Accordingly, the collision sound is reduced. Also, the following expression is established:

$$G > F,$$

where, referring to FIG. 17, G is a distance between the contact surface 3011 and the wall portion 3012 immediately before the protruding portion 4007 contacts the stopper 3010, and F is a distance between the contact portion 6001 and the mechanical-end contact portion 4006. Namely, the distance G is larger than the distance F.

Accordingly, even if the shift movable frame 3000 moves in the arrow Z direction together with the focus movable frame 4000, the mechanical-end contact portion 4006 (mechanical end) contacts the contact portion 6001 before the wall portion 3012 contacts the contact surface 3011. Thus, a load, which causes a tooth of the rack 3004 to be skipped, exerted on the rack 3004 in the arrow Z direction is reduced.

As described above, the collision sound as a result of the movement of the focus movable frame 4000 in the nonenergized state is reduced by the elastic deformation of the torsion coil spring 3005. To correctly detect the reference position of the focus movable frame 4000, i.e., to correctly detect the origin position of the focus motor for control, the contact portion 6001 of the rear barrel 6000, the contact portion which is the mechanical end (origin position) of the focus movable frame 4000, has to contact the mechanical-end contact portion 4006.

In this embodiment, when the state is changed from the nonenergized state to the energized state, a control unit (not shown) controls the shift movable frame 3000 to move outside the movable range of the focus movable frame 4000 in the arrow Z direction as shown in FIG. 19. Then, the contact portion 6001, which is the mechanical end of the focus movable frame 4000, can contact the mechanical-end contact portion 4006. Upon the application of electricity to the coil, the focus movable frame 4000 moves toward the object, i.e., in the arrow Z direction. The MR sensor 4005 detects a state in which the contact portion 6001 of the rear barrel 6000, the contact portion which is the mechanical end, contacts the mechanical-end contact portion 4006, as a reference position.

As described above, in this embodiment, the collision sound of the focus motor is reduced in the nonenergized state, and the origin position of the focus motor for control is correctly detected in the energized state. Thus, a driving amount of the focus motor from the origin position, that is, a moving distance of the focus movable frame 4000 from the reference position can be correctly and stably detected by using the MR sensor 4005 and the sensor magnet 4004. Further, since the torsion coil spring 3005, which is an existing part, serves as the shock-absorbing portion, the collision sound can be reduced with a simple configuration without an increase in the number of parts.

Figure 20:
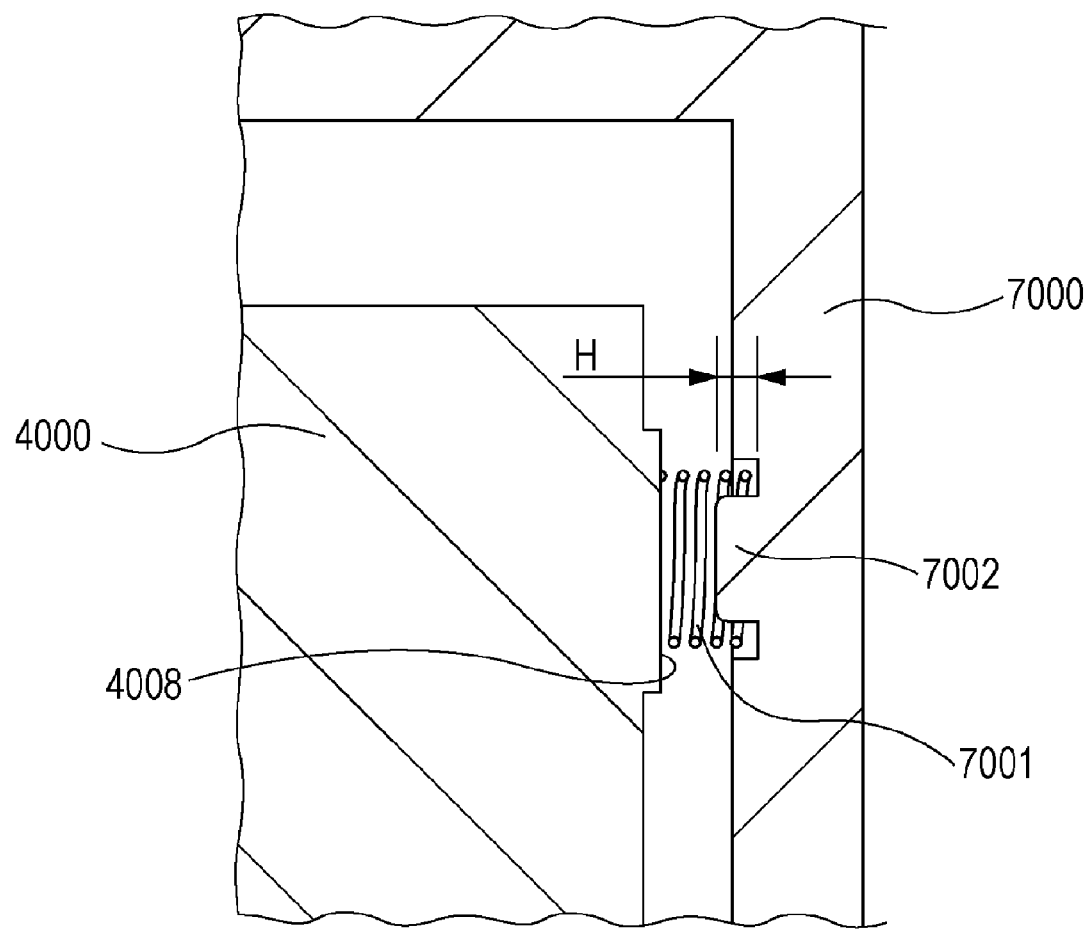
FIG. 20 is a detailed view showing a structure of shock absorption in portion XX in FIG. 16.

In addition, a shock-absorbing portion may be provided at the focus movable frame 4000 at a side near the CCD holder 7000, i.e., at a mechanical-end side in the −Z direction to reduce the collision sound as a result of the movement of the focus movable frame 4000 in the nonenergized state. FIG. 20 is a detailed view showing a structure of shock absorption in portion XX in FIG. 16. Referring to FIG. 20, a state in which a contact portion 7002 provided at the CCD holder 7000 contacts a mechanical-end contact surface 4008 provided at the focus movable frame 4000 defines a mechanical end in a direction toward the CCD holder 7000. A coil spring 7001 is attached to the CCD holder 7000 by a certain method (not shown). The coil spring 7001 has a longer natural length than a length H of the contact portion 7002 like the first embodiment. Also, the length of the coil spring 7001 is determined such that the length does not interfere with the movable range of the focus movable frame 4000 for focusing. Accordingly, the mechanical-end contact surface 4008 contacts the coil spring 7001 before the contact portion 7002, which is the mechanical end, contacts the mechanical-end contact surface 4008. Even if the focus movable frame 4000 moves to the mechanical end in the direction toward the CCD holder 7000, i.e., in the arrow −Z direction in the nonenergized state, a shock occurring at this time is absorbed by elastic deformation of the coil spring 7001, and collision sound generated at the mechanical end can be reduced.

In this embodiment, the coil spring 7001, which is the shock-absorbing portion, is arranged near the contact portion 7002. The coil spring 7001, which is the shock-absorbing portion, is only required to contact the focus movable frame 4000 before the contact portion 7002 contacts the mechanical-end contact surface 4008. As long as the above configuration is provided, the coil spring 7001 may be arranged at other position of the CCD holder 7000 or at the focus movable frame 4000. Also, the protruding portion 4007 and the stopper 3010 may a shock-absorbing portion.

Further, the shock-absorbing portion is not limited to the coil spring, and may be a leaf spring or a rubber member as long as the shock-absorbing portion can absorb the shock as a result of the contact between the protruding portion 4007 and the stopper 3010.

As described above, a lens barrel according to any of the embodiments of the present invention includes a first movable frame configured to hold an optical element, be movable in an optical-axis direction, and hold a position of the optical element in the optical-axis direction in a nonenergized state. The lens barrel also includes a second movable frame configured to hold an optical element, be movable in the optical-axis direction, and not hold a position of the optical element in the optical-axis direction in the nonenergized state. At least one of the first and second movable frames includes a shock-absorbing portion. In the nonenergized state, the first movable frame is positioned within a movable range of the second movable frame. With this configuration, in any of the embodiments, the collision sound at both the mechanical ends of the focus movable frame 4 or 4000 can be reduced merely by adding the shock-absorbing portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-264957 filed Nov. 20, 2009 and No. 2010-195633 filed Sep. 1, 2010, which are hereby incorporated by reference herein in their entirety.

What is claimed is:

1. A lens barrel comprising:
a first frame configured to include a stop portion protruding in an optical-axis direction and hold a first optical element;
a first drive unit configured to move the first frame in the optical-axis direction and hold a position in the optical-axis direction of the first frame in a nonenergized state;
a second frame configured to include a protrusion protruding in the optical-axis direction and hold a second optical element;
a second drive unit configured to move the second frame in the optical-axis direction and not hold a position in the optical-axis direction of the second frame in the nonenergized state; and
a shock-absorbing portion provided at least one of the first and second frames,
wherein the first frame moves such that it is positioned within a range in the optical-axis direction of the second frame when a state is changed from an energized state to the nonenergized state, and
wherein the shock-absorbing portion absorbs a shock that is generated by the second frame against the first frame when the second frame moves in the optical-axis direction in the nonenergized state and hence the protrusion of the second frame contacts the stop portion of the first frame.

2. The lens barrel according to claim 1,
wherein the first frame is retracted outside the range of the second frame when the state is changed from the nonenergized state to the energized state,
wherein the second frame includes a surface located at a side to which the first frame is retracted, and configured to contact a surface of a barrel that is different from the first frame,
wherein the lens barrel further comprises a position sensor configured to detect a position at which the surface of the second frame contacts the surface of the barrel, and
wherein the position detected by the position sensor serves as a reference position that is referenced when the second frame moves in the optical-axis direction.

3. The lens barrel according to claim 1,
wherein the first frame includes a transmission portion to which a driving force is transmitted from the first drive unit, and
wherein the shock-absorbing portion absorbs a shock that is applied to the transmission portion by the first frame when the protrusion of the second frame contacts the stop portion of the first frame and hence the first frame moves in the optical-axis direction toward a side opposite the second frame.

4. The lens barrel according to claim 3,
wherein the following expression is established $$C<D,$$

where C is a distance from the surface of the second frame to the surface of the barrel when the protrusion of the second frame contacts the stop portion of the first frame and then the second frame moves in the optical-axis direction toward the first frame while the first frame is stopped in the nonenergized state, and, if the first frame includes a contact surface and the transmission portion includes a wall portion and the contact surface contacts the wall portion when the first frame moves in the optical-axis direction, D is a distance from the wall portion to the contact portion.

5. The lens barrel according to claim 1, wherein the shock-absorbing portion is arranged between the first frame and a transmission portion.

6. The lens barrel according to claim 1, wherein the shock-absorbing portion is the protrusion provided at the second frame and formed of an elastic member.

7. The lens barrel according to claim 5,
wherein the first drive unit is a stepping motor, the stepping motor being configured to rotate a lead screw and hence move the transmission portion that meshes with the lead screw in the optical-axis direction, and
wherein the shock-absorbing portion is a coil spring.

8. The lens barrel according to claim 7, wherein the coil spring also serves as a member that reduces backlash between the first frame and the transmission portion.

9. The lens barrel according to claim 8, wherein the second drive unit is a voice coil motor including a coil and a magnet.

10. An optical device comprising the lens barrel according to claim 1.

11. A lens barrel comprising:
a first frame including a holding portion that holds a first optical element, and a transmission portion;

a first drive unit configured to move the first frame in an optical-axis direction and hold a position in the optical-axis direction of the first frame in a nonenergized state, a driving force from the first drive unit being transmitted to the holding portion through the transmission portion;

a second frame configured to hold a second optical element;

a second drive unit configured to move the second frame in the optical-axis direction and not hold a position in the optical-axis direction of the second frame in the nonenergized state;

a shock-absorbing portion provided between the holding portion and the transmission portion; and a control unit configured to control the first frame to move such that at least part of the first frame is positioned within a range in the optical-axis direction of the second frame when a state of the second drive unit is changed from an energized state to the nonenergized state, wherein the shock-absorbing portion absorbs a shock that is generated by the second frame against the first frame when the second frame moves in the optical-axis direction in the nonenergized state and hence the second frame contacts the first frame.

* * * * *